US012666510B2

(12) United States Patent
Yang

(10) Patent No.: US 12,666,510 B2
(45) Date of Patent: Jun. 23, 2026

(54) LIGHTING APPARATUS

(71) Applicant: Shu-Mei Ku, Taoyuan City (TW)

(72) Inventor: Cheng-Tao Yang, Taoyuan City (TW)

(73) Assignee: Shu-Mei Ku, Taoyuan City (TW)

( * ) Notice: Subject to any disclaimer, the term of this patent is extended or adjusted under 35 U.S.C. 154(b) by 51 days.

(21) Appl. No.: 19/008,473

(22) Filed: Jan. 2, 2025

(65) Prior Publication Data

US 2025/0227830 A1 Jul. 10, 2025

(30) Foreign Application Priority Data

Jan. 4, 2024 (TW) ................................ 113200132
Apr. 25, 2024 (TW) ................................ 113204165

(51) Int. Cl.
*H05B 45/28* (2020.01)
*H05B 45/18* (2020.01)

(52) U.S. Cl.
CPC ............. *H05B 45/28* (2020.01); *H05B 45/18* (2020.01)

(58) Field of Classification Search
CPC ........ H05B 45/20; H05B 47/10; H05B 47/16; H05B 45/10; H05B 45/12; H05B 45/22; H05B 45/24; H05B 47/195; H05B 47/196; H05B 47/1965; H05B 47/199; H05B 45/00; H05B 47/105; H05B 45/18; H05B 45/28; H05B 47/155; H05B 45/14; H05B 45/325; H05B 45/34; H05B 45/347; H05B 45/355; H05B 45/375; H05B 45/38; H05B 45/56; H05B 47/14; H05B 47/24; H05B 33/02
See application file for complete search history.

(56) References Cited

U.S. PATENT DOCUMENTS

2019/0159313 A1* 5/2019 Yamakawa ............ H05B 45/20

* cited by examiner

*Primary Examiner* — Monica C King
(74) *Attorney, Agent, or Firm* — HSML P.C.

(57) ABSTRACT

A lighting apparatus includes a light source unit including first, second and third white light source groups each of which is capable of emitting a white light, and a control unit. The first, second and third white light source groups have different correlated color temperatures. The control unit is electrically connected to the light source unit, and controls brightness of the first, second and third white light source groups to allow a light mixed by the first, second and third white light source groups to be substantially similar to sunlight.

19 Claims, 22 Drawing Sheets

LIGHTING APPARATUS

CROSS-REFERENCE TO RELATED APPLICATION

This application claims priority to Taiwanese Utility Model Patent Application Nos. 113200132 and 113204165, filed on Jan. 4, 2024, and Apr. 25, 2024, respectively. The entire disclosure of each of the Taiwanese Utility Model patent applications is incorporated by reference herein.

FIELD

The present disclosure relates to a lighting apparatus, and more particularly to a lighting apparatus capable of adjusting color and brightness of light.

BACKGROUND

A light-emitting diode (abbreviated as LED hereinafter) has advantages of low power consumption, short response time, and long service time, and thus is widely used. Since a conventional LED is only capable of emitting a monochromatic light, mixing of lights of different colors emitted from several LEDs is required in order to obtain a white light. In order for a lighting device to provide light sources with different color temperatures, two groups of LEDs with different color temperatures are disposed in such lighting device. For example, a conventional lighting device includes a first LED with a low color temperature and a second LED with a high color temperature. Referring to FIG. 1, in an international Commission on Illumination (CIE) chromaticity diagram of the conventional lighting device, the chromaticity coordinates of the first LED and the second LED are represented by coordinate 91 and coordinate 92, respectively. By adjusting the brightness of the first LED and the second LED, the color temperature of a resultant mixed light moves along a line connecting the coordinate 91 and the coordinate 92 (i.e., the dashed line shown in FIG. 1), thereby allowing the conventional lighting device to emit light having predetermined color temperature.

However, as shown in the CIE chromaticity diagram of the aforesaid conventional lighting device, only the two end points of the line connecting the coordinate 91 of the first LED and the coordinate 92 of the second LED are located on a blackbody radiation locus 80 (i.e., the curve representing the color temperature of a light source similar to sunlight or white light as shown in FIG. 1), whereas other line segments of such line, especially the middle light segment, are located relatively far from the blackbody radiation locus 80. In other words, the color temperature of a resultant mixed light determined based on the CIE chromaticity diagram is significantly different from the color temperature of actual sunlight.

SUMMARY

Therefore, an object of the present disclosure is to provide a lighting apparatus that can alleviate at least one of the drawbacks of the prior art.

According to the present disclosure, the lighting apparatus includes a light source unit and a control unit. The light source unit includes a first white light source group, a second white light source group and a third white light source group each of which is capable of emitting a white light. In a CIE chromaticity diagram, chromaticity coordinates of the first white light source group, the second white light source group and the third white light source group are defined as a first coordinate, a second coordinate and a third coordinate, respectively. The first white light source group, the second white light source group and the third white light source group have different correlated color temperatures. In the CIE chromaticity diagram, a first line has three line segments each of which interconnects two corresponding ones of the first coordinate, the second coordinate and the third coordinate. The first line intersects a blackbody radiation locus, and encloses and defines a first chromaticity region. A portion of the blackbody radiation locus is located within the first chromaticity region. In the CIE chromaticity diagram, a chromaticity coordinate of a light mixed by the first white light source group, the second white light source group and the third white light source group is defined as a mixed light coordinate. In the CIE chromaticity diagram, the second coordinate is positioned within a quadrilateral region formed by four lines interconnecting a first point represented by coordinate of (x=0.47095, y=0.417), a second point represented by coordinate of (x=0.36139, y=0.36706), a third point represented by coordinate of (x=0.53479, y=0.5279) and a fourth point represented by coordinate of (x=0.37516, y=0.44772) in an xy chromaticity space. The control unit is electrically connected to the light source unit, such that when the control unit provides an electrical energy to the light source unit to control brightness of each of the first white light source group, the second white light source group and the third white light source group, the mixed light coordinate moves within the first chromaticity region.

BRIEF DESCRIPTION OF THE DRAWINGS

Other features and advantages of the present disclosure will become apparent in the following detailed description of the embodiment(s) with reference to the accompanying drawings. It is noted that various features may not be drawn to scale.

DETAILED DESCRIPTION

Figure 1:
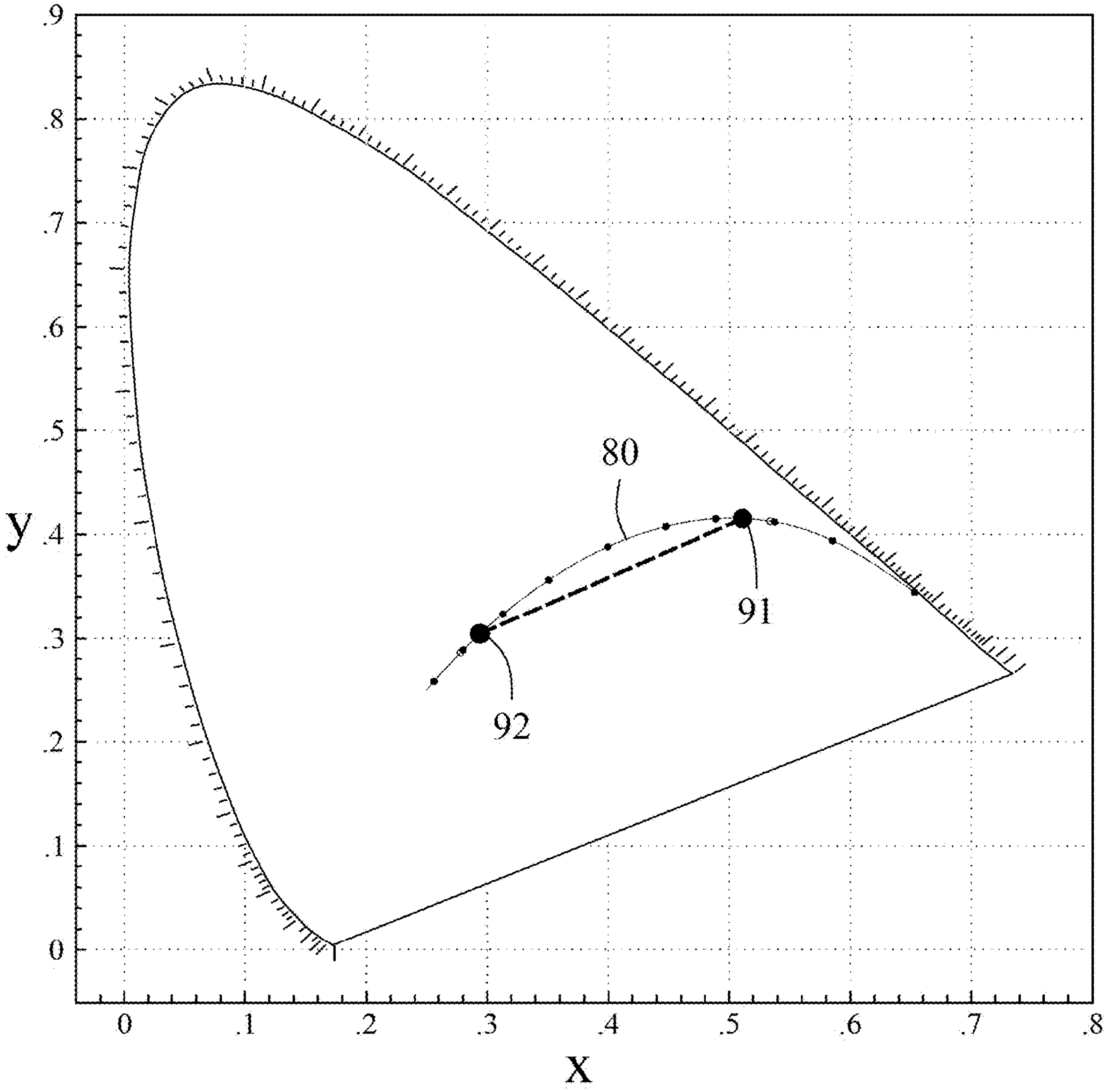
FIG. 1 PRIOR ART
FIG. 1 is a CIE chromaticity diagram illustrating the chromaticity coordinates of a first light-emitting diode and a second light-emitting diode of a conventional lighting device.

Before the present disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
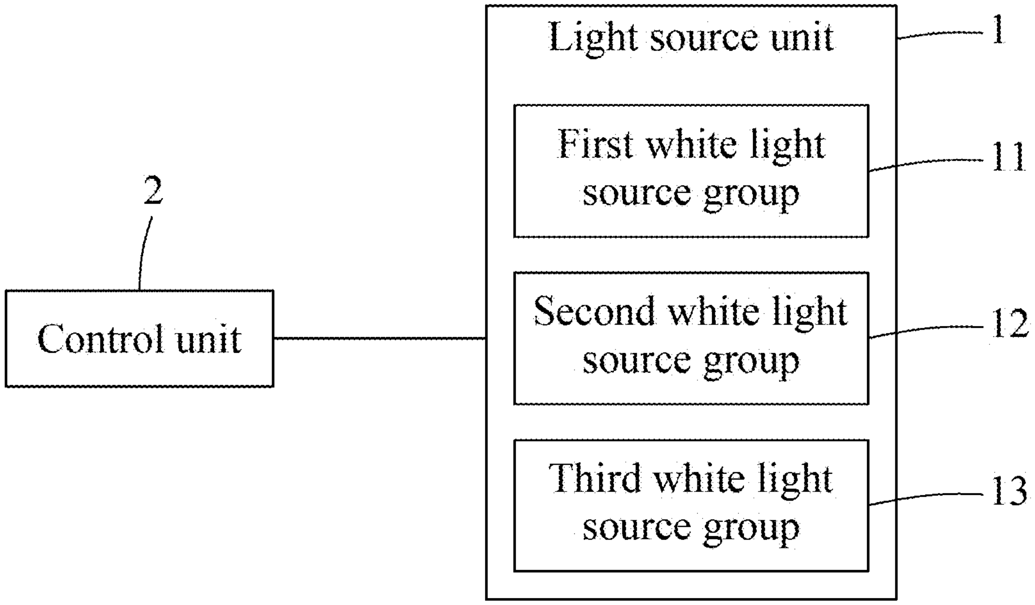
FIG. 2 is a block diagram illustrating the configuration of a lighting apparatus according to a first embodiment of the present disclosure.
Figure 3:
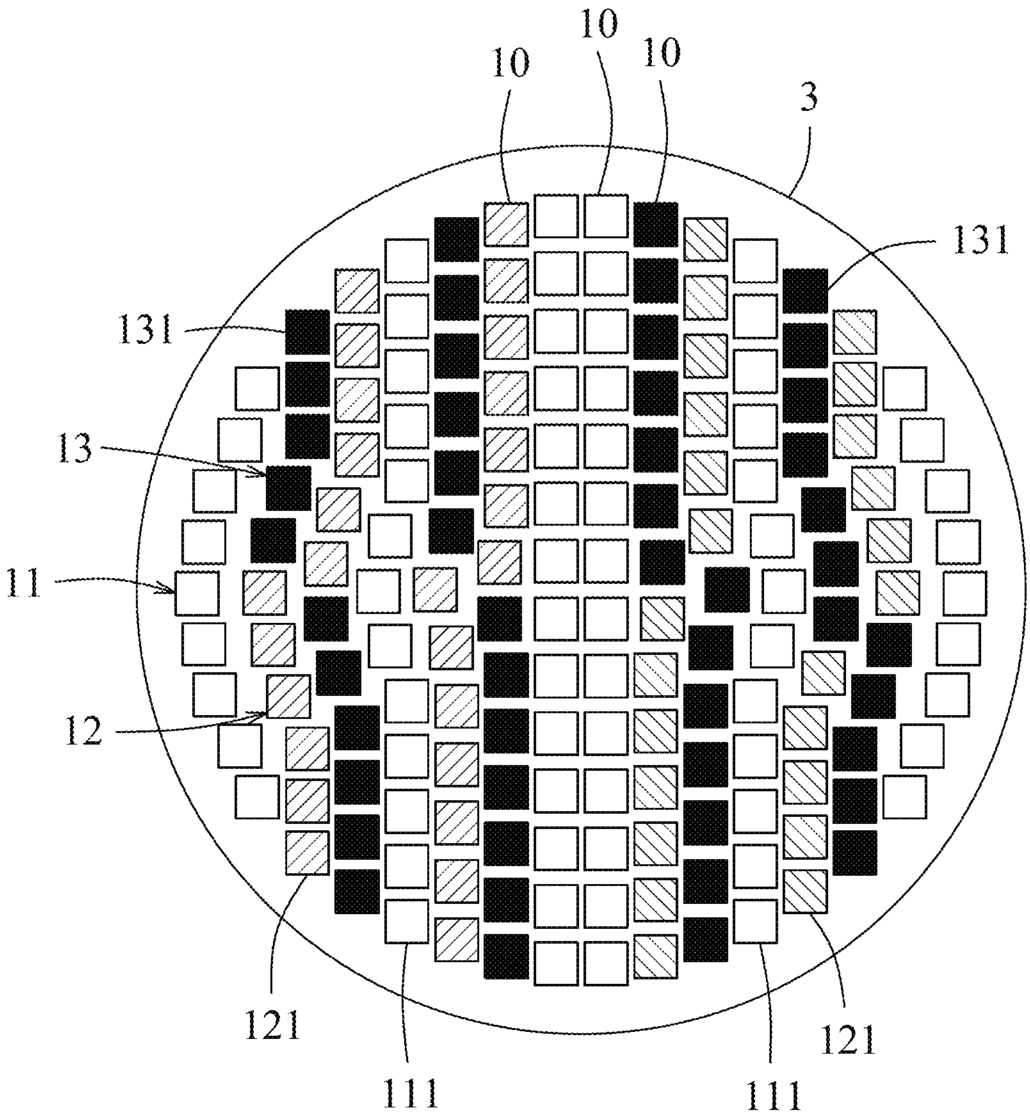
FIG. 3 is a schematic view illustrating an arrangement of a first white light source group, a second white light source group and a third white light source group of the lighting apparatus according to the first embodiment of the present disclosure.

Referring to FIGS. 2 and 3, a lighting apparatus according to a first embodiment of the present disclosure includes a light source unit 1, a control unit 2 and a substrate 3. Examples of the lighting apparatus may include, photography lamps, recessed ceiling lamps, desk lamps, plant grow lights, etc.

Figure 12:
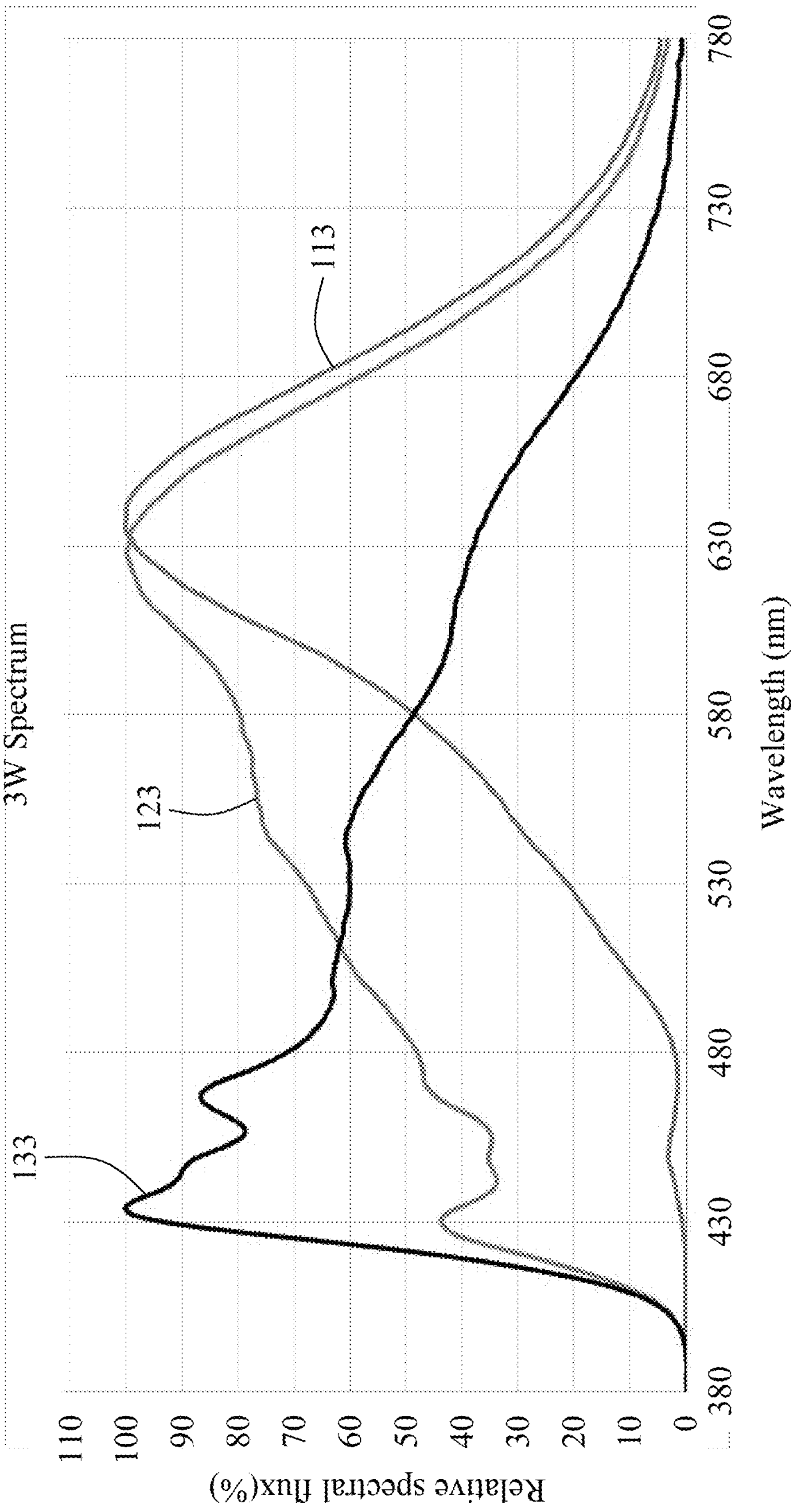
FIG. 12 shows spectral waveforms of light emitted by the first white light source group, the second white light source group and the third white light source group of the lighting apparatus according to the first embodiment of the present disclosure.

The light source unit 1 includes a first white light source group 11, a second white light source group 12 and a third white light source group 13 that are capable of emitting white light (see FIG. 2). In other words, in the first embodiment, each of the first white light source group 11, the second white light source group 12 and the third white light source group 13 is configured to emit white light. The first white light source group 11, the second white light source group 12 and the third white light source group 13 have different correlated color temperatures. As defined herein, the aforesaid white light has a continuous spectrum, a wavelength ranging from 380 nm to 780 nm, and a color tone that can be adjusted to be reddish, yellowish or bluish depending on the color temperature. The spectral waveform of light emitted by the first white light source group 11 is a first spectral waveform 113, the spectral waveform of light emitted by the second white light source group 12 is a second spectral waveform 123, and the spectral waveform of light emitted by the third white light source group 13 is a third spectral waveform 133 (see FIG. 12).

Each of the first white light source group 11, the second white light source group 12, and the third white light source group 13 includes a plurality of light-emitting elements 10 (see FIG. 3). The light-emitting elements 10 in the first white light source group 11 are also referred to as a plurality of first light-emitting elements 111, the light-emitting elements 10 in the second white light source group 12 are also referred to as a plurality of second light-emitting elements 121, and the light-emitting elements 10 in the third white light source group 13 are also referred to as a plurality of third light-emitting elements 131. The first light-emitting elements 111 of the first white light source group 11, the second light-emitting elements 121 of the second white light source group 12, and the third light third light-emitting elements 131 of the third white light source group 13 are arranged in a staggered orientation on the substrate 3 in a slightly circular pattern overall. The staggered orientation of the light-emitting elements 10 of each of the first white light source group 11, the second white light source group 12 and the third white light source group 13 permits uniform mixing of lights emitted by such light-emitting elements 10. It should be noted that, the orientation and overall pattern of the light-emitting elements 10 are not limited to a specific arrangement. In this embodiment, the different types of arrangement of the light source unit 1 on the substrate 3 are described hereinafter. It should be noted that the number of the light-emitting elements 10 in each of the first white light source group 11, the second white light source group 12 and the third white light source group 13 may be changed according to actual requirements. In certain embodiments, each of the first white light source group 11, the second white light source group 12 and the third white light source group 13 includes only one of the light-emitting elements 10, i.e., the light source unit 1 includes three light-emitting elements 10 respectively corresponding to the first white light source group 11, the second white light source group 12 and the third white light source group 13.

Figure 4:
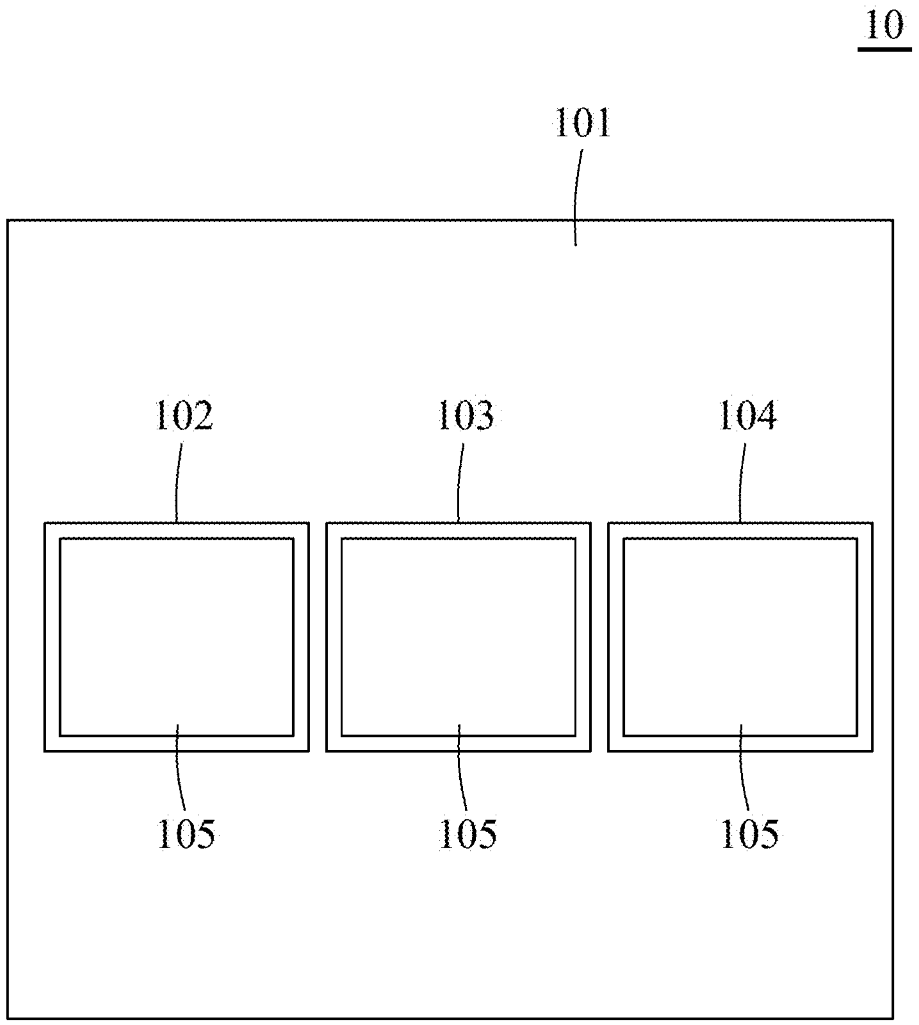
FIG. 4 is a schematic view illustrating the configuration of a light-emitting element of the lighting apparatus which includes a bottom plate, a first light-emitting diode, a second light-emitting diode, a third light-emitting diode, and three phosphor layers.

Referring to FIG. 4, each of the light-emitting elements 10 includes a bottom plate 101, a first light-emitting diode 102, a second light-emitting diode 103, and a third light-emitting diode 104 each disposed on the bottom plate 101, and three phosphor layers 105 respectively covering a surface of the light-emitting diode 102, a surface of the second light-emitting diode 103, and a surface of the third light-emitting diode 104. The first light-emitting diode 102, the second light-emitting diode 103, and the third light-emitting diode 104 are basically light-emitting diode packaging components. To be specific, the first light-emitting diode 102 is capable of emitting a first blue light having a wavelength ranging from 410 nm to 450 nm, the second light-emitting diode 103 is capable of emitting a second blue light having a wavelength ranging from 450 nm to 470 nm, and the third light-emitting diode 104 is capable of emitting a third blue light having a wavelength ranging from 460 nm to 490 nm (not shown in figures). The first blue light, the second blue light, and the third blue light, after passing through the three phosphor layers 105, respectively, are mixed so as to obtain a mixed light having a color temperature ranging from 1800 K and 25000 K.

The three phosphor layers 105 contain phosphor powders with different colors. The types and compositional ratios of the phosphor powders vary according to the wavelengths of the first blue light, the second blue light and the third blue light respectively emitted by the first light-emitting diode 102, the second light-emitting diode 103, and the third light-emitting diode 104, and may be adjusted according to requirements.

Figure 5:
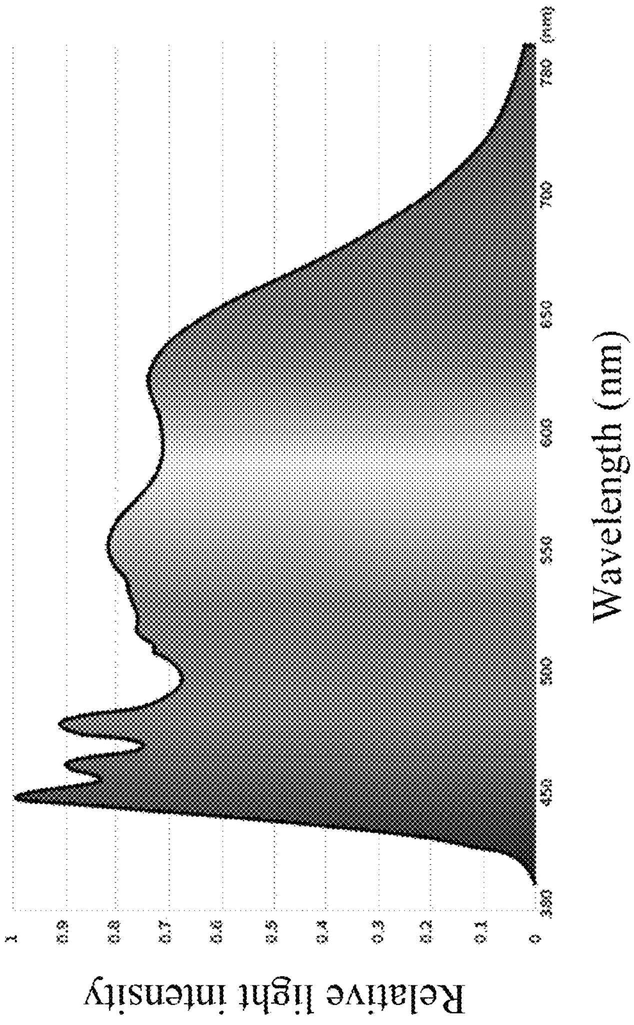
FIG. 5 is a spectrum diagram illustrating changes in relative light intensity at different wavelengths of a white light emitted from the light-emitting element of the lighting apparatus.

Referring to FIG. 5, the three phosphor layers 105, after absorbing the first blue light, the second blue light and the third blue light, respectively, are excited by the first blue light, the second blue light and the third blue light, respectively, to emit predetermined lights having different colors, respectively, such that when the predetermined lights are mixed with each other, the light-emitting element 10 emits a white light with sufficient bluish green color tone, thereby permitting the white light to simulate sunlight.

With the aforesaid configuration, the white light emitted by the light-emitting element 10 has a very high color rendering index (CRI) value (i.e., a quantitative measurement of a light source's ability to present the real colors of objects, abbreviated as CRI). To be specific, the white light emitted by the light-emitting element 10 has color rendering indexes R1 to R15 of greater than 90. In particular, when the light-emitting element 10 has a correlated color temperature of 5886 K, the white light emitted by the light-emitting element 10 has color rendering indexes R9 and R12 of greater than 93, which enhances the effect of reproducing the real colors of objects. The measured values of the color rendering indexes Ra and R1 to R15 for the white light emitted by the light-emitting element 10 of this embodiment under the correlated color temperature of 5886 K are shown in Table 1 below.

TABLE 1

| | Color rendering index | | | | | | | |
|---|---|---|---|---|---|---|---|---|
| | Ra | R1 | R2 | R3 | R4 | R5 | R6 | R7 |
| Measured value | 98 | 99 | 99 | 96 | 97 | 99 | 98 | 97 |

| | Color rendering index | | | | | | | |
|---|---|---|---|---|---|---|---|---|
| | R8 | R9 | R10 | R11 | R12 | R13 | R14 | R15 |
| Measured value | 97 | 99 | 96 | 98 | 96 | 99 | 97 | 98 |

Figure 6:
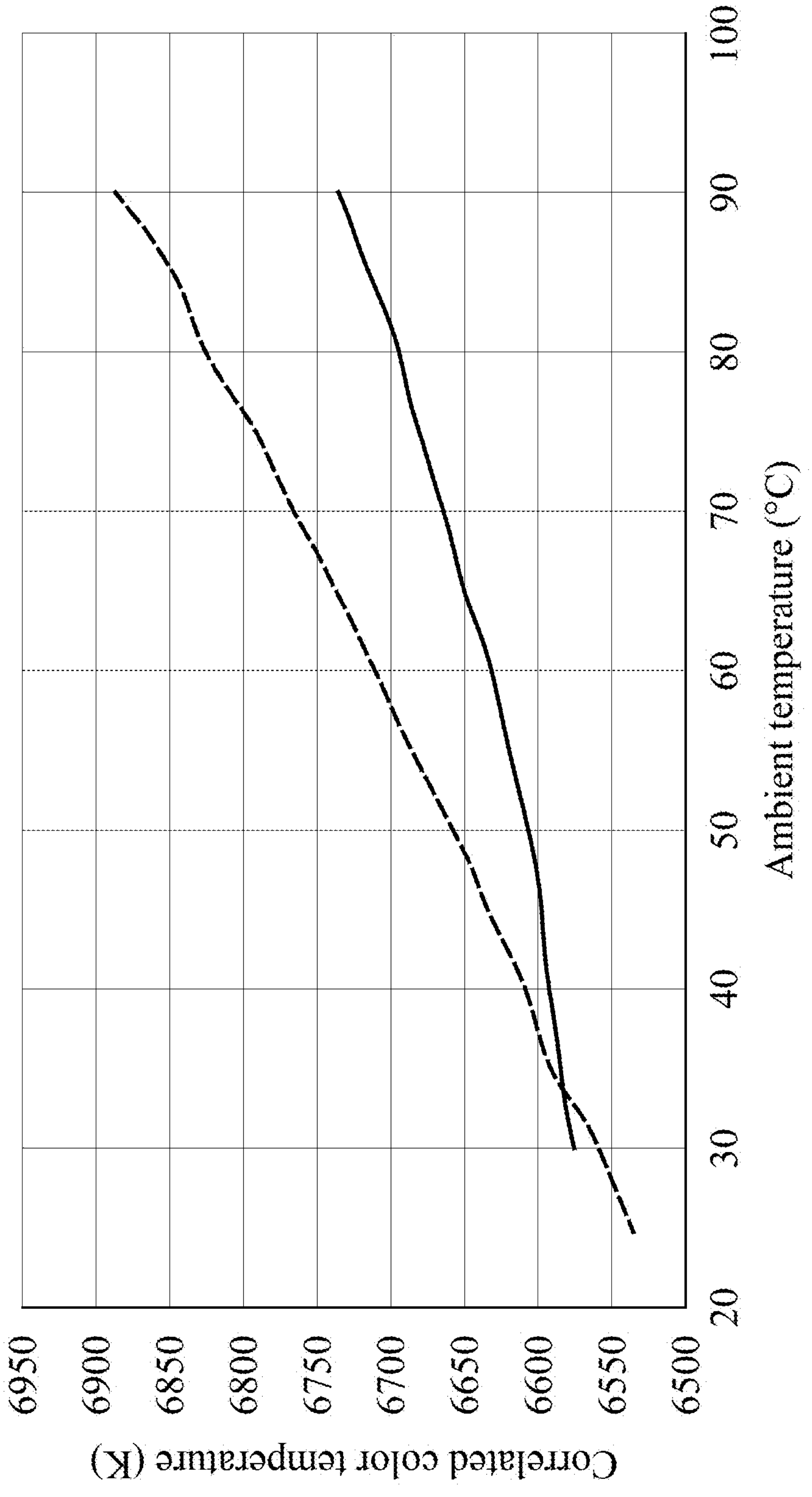
FIG. 6 is a graph showing changes in correlated color temperature at different ambient temperatures of a white light emitted from the light-emitting element according to the first embodiment and a white light emitted from a conventional light-emitting element.

FIG. 6 is a graph showing changes in correlated color temperature at different ambient temperatures of a white light emitted from the light-emitting element 10 according to the first embodiment and a white light emitted from a conventional light-emitting element, where the change in correlated color temperature of the white light emitted from the light-emitting element 10 according to the first embodiment is represented by a solid line therein, whereas the change in correlated color temperature of the white light emitted from the conventional light-emitting element is represented by a dashed line therein. As shown in FIG. 6, the correlated color temperature of the white light emitted from the light-emitting element 10 according to the first embodiment is clearly less affected by the ambient temperature compared with the correlated color temperature of the white light emitted from the conventional light-emitting element.

Figure 7:
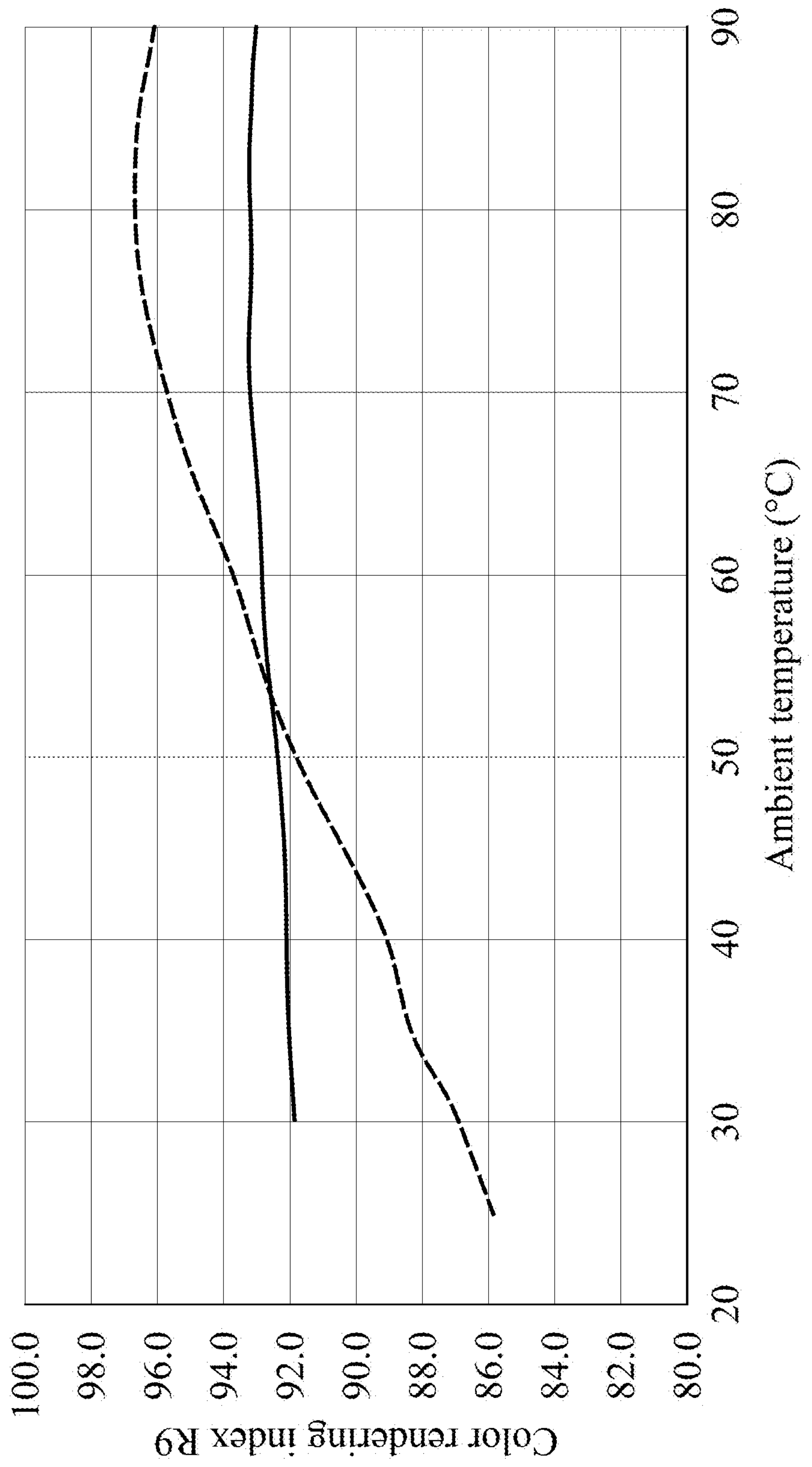
FIG. 7 is a graph showing changes in color rendering index R9 at different ambient temperatures of a white light emitted from the light-emitting element according to the first embodiment and a white light emitted from the conventional light-emitting element.

FIG. 7 is a graph showing changes in color rendering index R9 at different ambient temperatures of a white light emitted from the light-emitting element 10 according to the first embodiment and a white light emitted from the conventional light-emitting element, where the change in color rendering index R9 of the white light emitted from the light-emitting element 10 according to the first embodiment is represented by a solid line therein, whereas the change in color rendering index R9 of the white light emitted from the conventional light-emitting element is represented by a dashed line therein. As shown in FIG. 7, the color rendering index R9 of the white light emitted from the light-emitting element 10 at an ambient temperature ranging from 30° C. to 90° C. is constantly greater than 91, indicating that the color rendering index R9 of the white light emitted from the light-emitting element 10 according to the first embodiment is clearly less affected by the ambient temperature compared with the color rendering index R9 of the white light emitted from the conventional light-emitting element.

Figure 8:
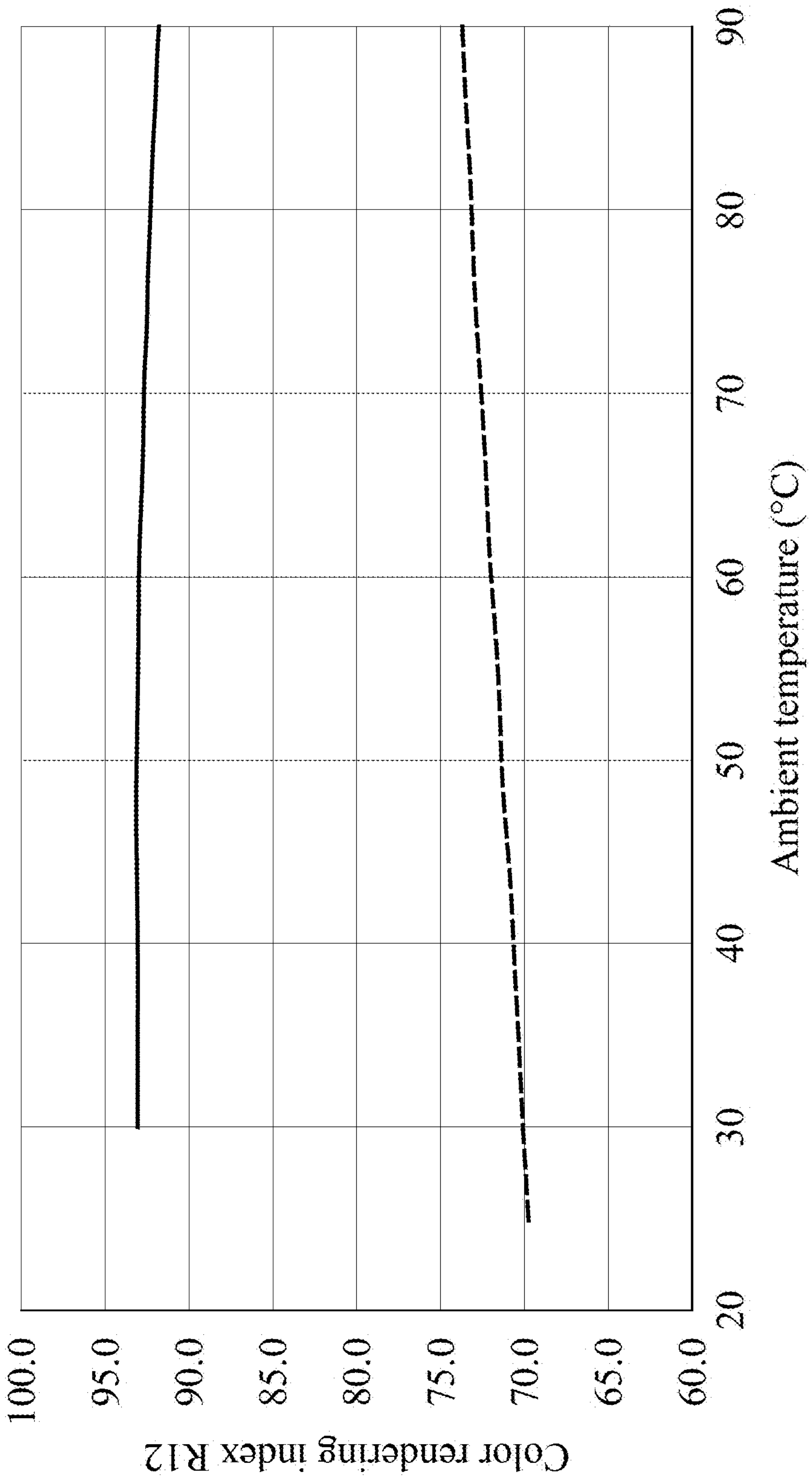
FIG. 8 is a graph showing changes in color rendering index R12 at different ambient temperatures of a white light emitted from the light-emitting element according to the first embodiment and a white light emitted from the conventional light-emitting element.

FIG. 8 is a graph showing changes in color rendering index R12 at different ambient temperatures of a white light emitted from the light-emitting element according to the first embodiment and a white light emitted from the conventional light-emitting element, where the change in color rendering index R12 of the white light emitted from the light-emitting element 10 according to the first embodiment is represented by a solid line therein, whereas the change in color rendering index R12 of the white light emitted from the conventional light-emitting element is represented by a dashed line therein. As shown in FIG. 8, the color rendering index R12 of the white light emitted from the light-emitting element 10 at an ambient temperature ranging from 30° C. to 90° C. is constantly greater than 91.

Figure 9:
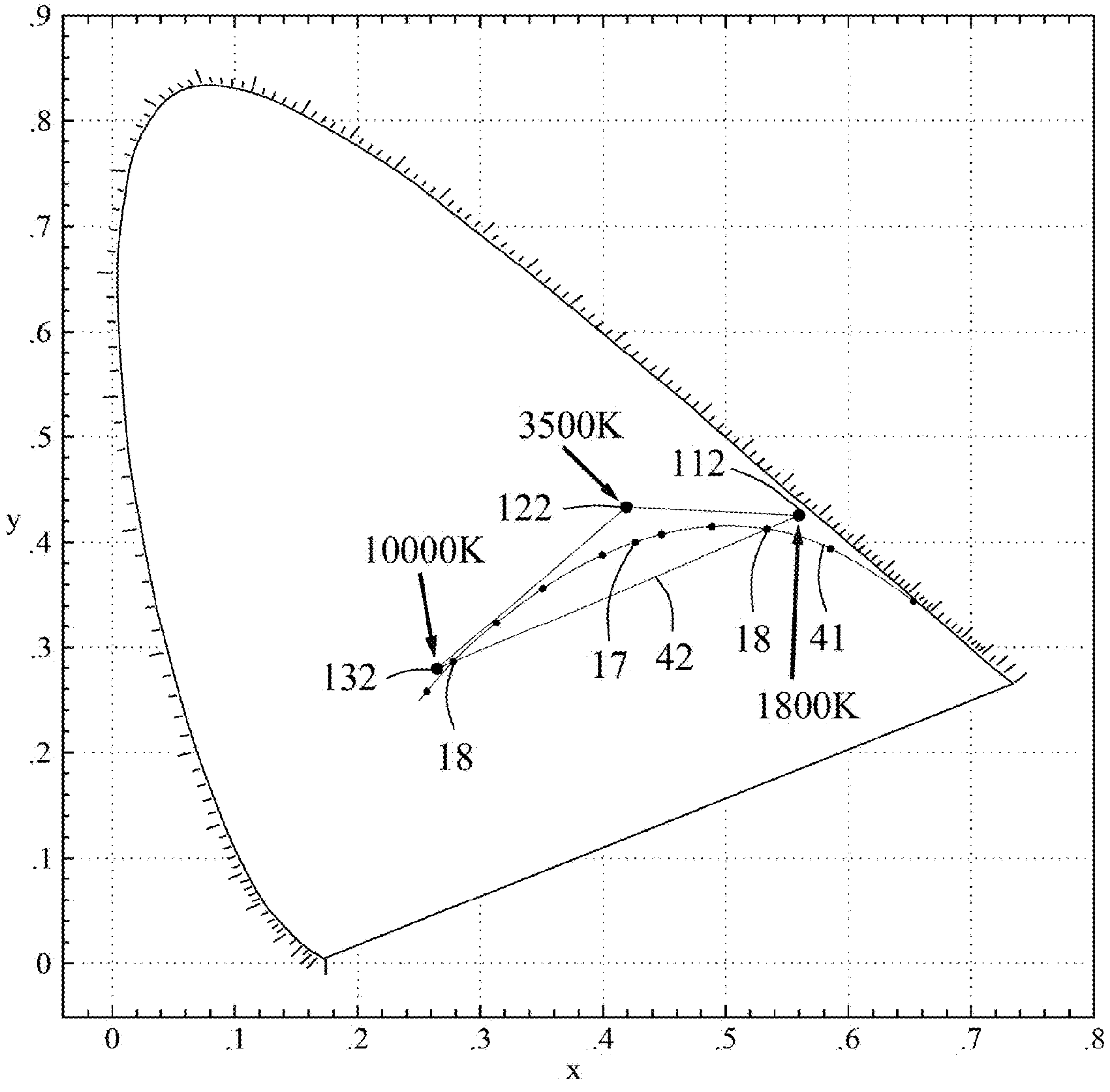
FIG. 9 is a CIE chromaticity diagram illustrating the chromaticity coordinates of the first white light source group, the second white light source group and the third white light source group of the lighting apparatus according to the first embodiment of the present disclosure.

Referring to FIGS. 2 and 9 to 11, in a CIE chromaticity diagram, the chromaticity coordinate of the first white light source group 11 is defined as a first coordinate 112, the chromaticity coordinate of the second white light source group 12 is defined as a second coordinate 122, and the chromaticity coordinate of the third white light source group 13 is defined as a third coordinate 132. In this embodiment, the CIE chromaticity diagram is a CIE 1976 chromaticity diagram. Since the first white light source group 11, the second white light source group 12, and the third white light source group 13 have different correlated color temperatures, the first coordinate 112, the second coordinate 122 and the third coordinate 132 represent different correlated color temperatures. As shown in FIG. 9, in the CIE chromaticity diagram, a first line having three line segments each of which interconnects two corresponding ones of the first coordinate 112, the second coordinate 122 and the third coordinate 132, intersects a blackbody radiation locus 41. At least two of the first coordinate 112, the second coordinate 122 and the third coordinate 132 are not located on the blackbody radiation locus 41. In this embodiment, the first coordinate 112, the second coordinate 122 and the third coordinate 132 are not located on the blackbody radiation locus 41. However, if one of the first coordinate 112 and the third coordinate 132 is positioned on the blackbody radiation locus 41, the object of the present disclosure can be achieved.

According to the present disclosure, the correlated color temperature of the first coordinate 112 ranges from 1600 K to 2600 K, the correlated color temperature of the second coordinate 122 ranges from 2600 K to 4500 K, and the correlated color temperature of the third coordinate 132 ranges from 8000 K to 20000 K. In other words, the correlated color temperature of the first white light source group 11 ranges from 1600 K to 2600 K, the correlated color temperature of the second white light source group 12 ranges from 2600 K to 4500 K, and the correlated color temperature of the third white light source group 13 ranges from 8000 K to 20000 K. In this embodiment, as shown in FIG. 9, the correlated color temperature of the first white light source group 11 is 1800 K, the correlated color temperature of the second white light source group 12 is 3500 K, and the correlated color temperature of the third white light source group 13 is 10000 K. Referring to FIG. 11, the second coordinate 122, with reference to FIG. 9 or FIG. 10, is positioned within a quadrilateral region formed by four lines interconnecting a first point represented by coordinate of (x=0.47095, y=0.417), a second point represented by coordinate of (x=0.36139, y=0.36706), a third point represented by coordinate of (x=0.53479, y=0.5279) and a fourth point represented by coordinate of (x=0.37516, y=0.44772) in an xy chromaticity space.

Figure 10:
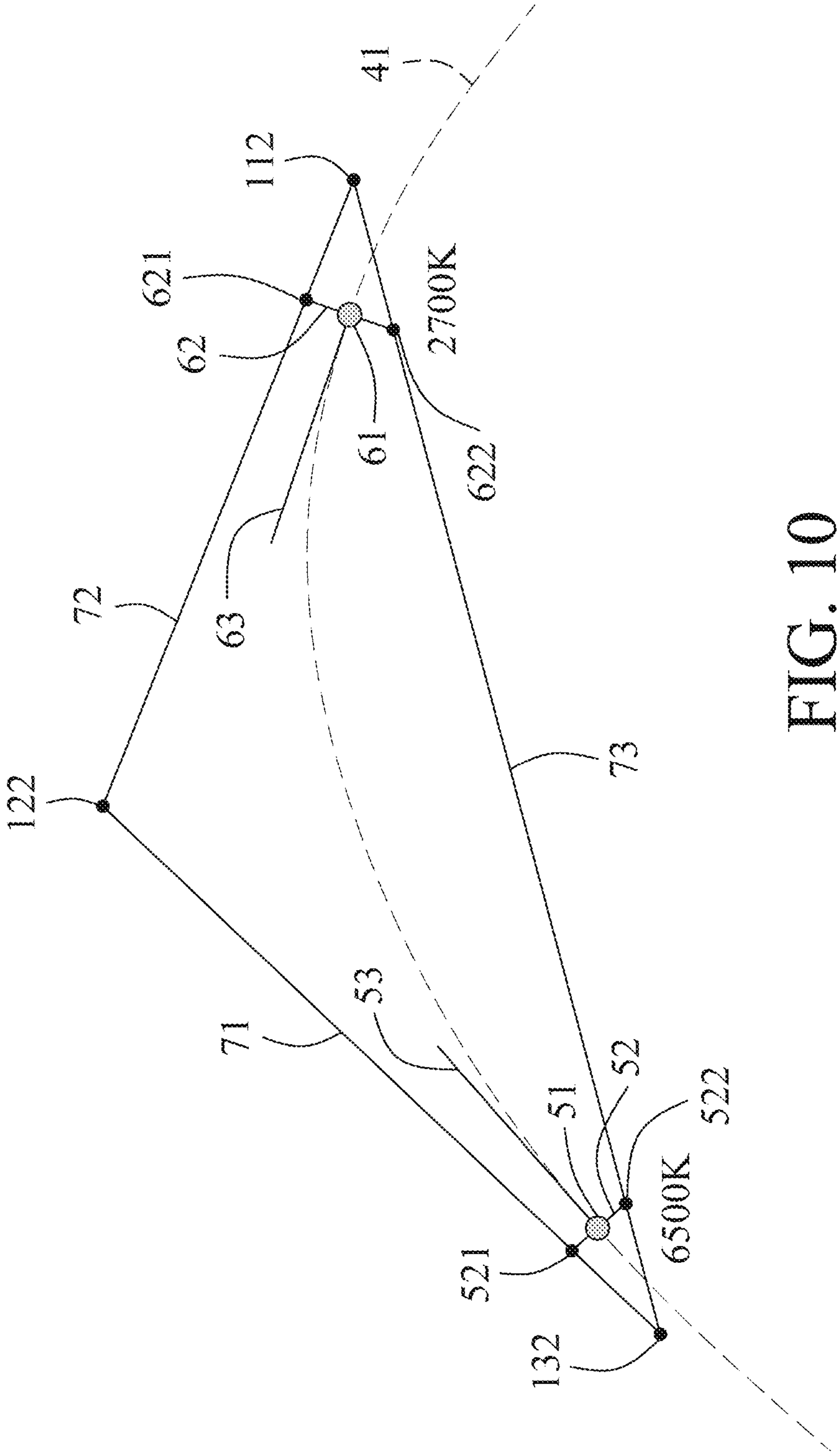
FIG. 10 is a schematic view illustrating the definition of a first coordinate, a second coordinate and a third coordinate in the CIE chromaticity diagram.
Figure 11:
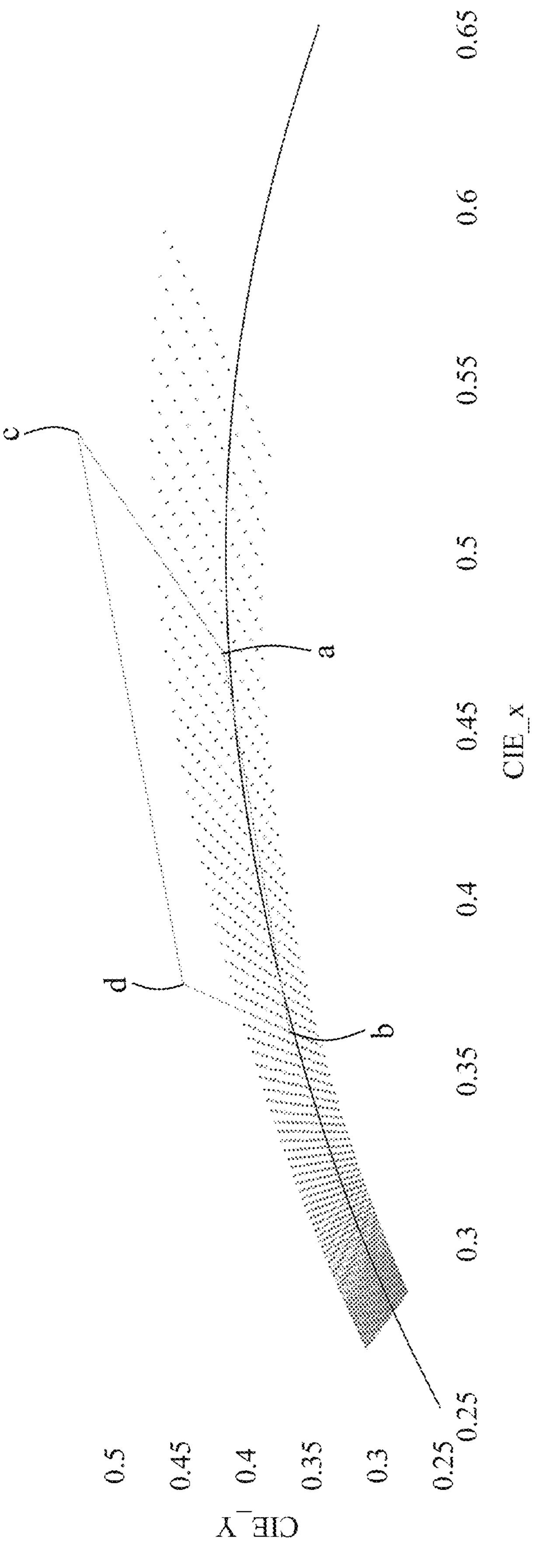
FIG. 11 is a CIE chromaticity diagram illustrating the chromaticity coordinate of the second white light source group which is positioned within a quadrilateral region in an xy chromaticity space.

Referring to FIGS. 9 and 10, the first coordinate 112, the second coordinate 122 and the third coordinate 132 in the CIE chromaticity diagram of a lamp, for example, are defined by the following steps (a) to (d). In step (a), a first color temperature coordinate 51 and a second color temperature coordinate 61 on the blackbody radiation locus 41 are determined based on a range of color temperature as desired by a user or a manufacturer. In step (b), a first positive intersection point 521, a first negative intersection point 522, a second positive intersection point 621 and a second negative intersection point 622 are determined. The first positive intersection point 521 and the first negative intersection point 522 are located on a first isochromatic temperature line 52 passing through the first color temperature coordinate 51, and are respectively a positive deviation and a negative deviation of a first $D_{uv}$ value from the first color temperature coordinate 51. The second positive intersection point 621 and the second negative intersection point 622 are located on a second isochromatic temperature line 62 passing through the second color temperature coordinate 61, and are respectively a positive deviation and a negative deviation of a second $D_{uv}$ value from the second color temperature coordinate 61. The first $D_{uv}$ value and the second $D_{uv}$ value may be the same or different, and may be determined as desired by the user. The first isochromatic temperature line 52 is a line which connects coordinates each having a color temperature same as that of the first color temperature coordinate 51, and the second isochromatic temperature line 62 is another line which connects coordinates each having a color temperature same as that of the second color temperature coordinate 61. The positive deviation of the first $D_{uv}$ value (i.e., the first positive intersection point 521) and the positive deviation of the second $D_{uv}$ value (i.e, the positive intersection point 621) are each greater than 0, i.e., positioned in an area above the blackbody radiation locus 41 in the CIE chromaticity diagram, whereas the negative deviation of the first $D_{uv}$ value (i.e., the first negative intersection point 522) and the negative deviation of the second $D_{uv}$ value (i.e., the second negative intersection point 622) are each less than 0, i.e., positioned in an area below the blackbody radiation locus 41 in the CIE chromaticity diagram. To be specific, the $D_{uv}$ value of a coordinate in the CIE chromaticity diagram is defined as a color deviation between the chromaticity coordinate and the blackbody radiation locus 41 (i.e., the smallest distance between the chromaticity coordinate and the blackbody radiation locus 41). In this embodiment, the positive deviation of the first $D_{uv}$ value (i.e., the first positive intersection point 521) and the positive deviation of the second $D_{uv}$ value (i.e., the second positive intersection point 621) are each 0.004, and the negative deviation of the first $D_{uv}$ value (i.e., the first negative intersection point 522) and the negative deviation of the second $D_{uv}$ value (i.e., the second negative intersection point 622) are each −0.004. In other words, the deviation of each of the first $D_{uv}$ value and the second $D_{uv}$ value ranges from −0.004 to 0.004. In step (c), a first tangent line 53 and a second tangent line 63 respectively along two tangent lines of the blackbody radiation locus 41 are determined, such that that the first tangent line 53 and the second tangent line 63 pass through the first color temperature coordinate 51 and the second color temperature coordinate 61, respectively. In step (d), the three line segments of the first line are respectively defined as a first line segment 71 that is parallel to the first tangent line 52 and passes through the first positive intersection point 521, a second line segment 72 that is parallel to the second tangent line 63 and passes through the first positive intersection point 621, and a third line segment 73 that passes through the first negative intersection point 522 and the second negative intersection point 622, such that the second coordinate 122 is defined as an intersection point between the first line segment 71 and the second line segment 72, the third coordinate 32 is defined as an intersection point between the first line segment 71 and the third line segment 73, and the first coordinate 112 is defined as an intersection point between the second line segment 72 and the third line segment 73.

According to the present disclosure, the first line intersects the blackbody radiation locus 41 at two intersection points 18, and a color temperature of one of the two intersection points 18 (i.e., the intersection point 18 closer to the first coordinate 112) is not greater than 1600 K while the color temperature of the other one of the two intersection points 18 (i.e., the intersection point 18 closer to the third coordinate 132) is not less than 20000 K. In other words, a light mixed by the first white light source group 11, the second white light source group 12 and the third white light source group 13 has a correlated color temperature ranging from 1600 K to 20000 K. As shown in FIG. 9, in this embodiment, the color temperature of one of the two intersection points 18 (i.e., the intersection point 18 closer to the first coordinate 112) is not greater than 2200 K while the color temperature of the other one of the two intersection points 18 (i.e., the intersection point 18 closer to the third coordinate 132) is not less than 8500 K. In addition, in this embodiment, one of the three line segments, which interconnects the first coordinate 112 and the third coordinate 132, intersects the blackbody radiation locus 41 at the two intersection points 18, but is not limited thereto. In other embodiments, the intersection points 18 are the locations where any two of the three line segments intersect the blackbody radiation locus 41. The first line, which interconnects the first coordinates 112, the second coordinates 122 and the third coordinates 132, encloses and defines a first chromaticity region 42, and a portion of the blackbody radiation locus 41 is located within the first chromaticity region 42. That is, the portion of the blackbody radiation locus 41 located within the first chromaticity region 42 serves as a target for light adjustment. As shown in FIG. 9, in the CIE chromaticity diagram, a chromaticity coordinate of a light mixed by the first white light source group 11, the second white light source group 12 and the third white light source group 13 is defined as a mixed light coordinate 17.

Referring to FIGS. 2, 9 and 10, the control unit 2 is electrically connected to the light source unit 1, such that when the control unit 2 provides an electrical energy (e.g., electrical current) to the light source unit 1 to control brightness of each of the first white light source unit group 11, the second white light source unit group 12 and the third white light source unit group 13, the mixed light coordinate 17 moves within the first chromaticity region 42 in accordance to the change in brightness of the same. An example of the control unit 2 includes a combination of a microprocessor, a storage device such as a memory, and a current driver. The control unit 2 is capable of, according to a predetermined algorithm, outputting a driving current to the first white light source group 11, the second white light source group 12 and the third white light source group 13 so as to control brightness of the same. The predetermined algorithm obtained based on the spectra of the first white light source group 11, the second white light source group 12 and the third white light source group 13, is used to determine distribution of power among the first white light source group 11, the second white light source group 12, and the third white light source group 13 (e.g., a power ratio of the first white light source group 11, to the second white light source group 12, and to the third white light source group 13 is 35:63:3) which correspond to a target color temperature of the mixed light (e.g., 3000 K). Such predetermined algorithm is stored in the control unit 2 in the form of a function or a table to indicate the relationship among the target color temperature of the mixed light and the power ratios of the first, second and third white light source groups 11, 12, 13. For example, when a power of 300 W is determined to be applied to the light source unit 1, such power can be distributed to the first white light source group 11 (35%), the second white light source group 12 (63%), and the third white light source group 13 (3%) according to the aforesaid power ratio so as to emit the mixed light having the predetermined color temperature (3000 K). Therefore, the brightness of the light emitted from the first, second and third white light source groups 11, 12, 13 can be varied by the power distributed to the first, second and third white light source groups 11, 12, 13.

In this embodiment, the percentages of the power ratio of the first white light source group 11, to the second white light source group 12 and to the third white light source group 13 for each of the correlated color temperatures of the mixed light obtained using the algorithm are shown in Table 2 below.

As shown in Table 2, the $D_{uv}$ value for each of the mixed lights under the correlated color temperatures of 2000 K to 8500 K (i.e., the target color temperatures) ranges from −0.0005 to 0.0005, and the color rendering index (CRI) value (i.e., a quantitative measurement of a light source's ability to present the real colors of objects) for the same is greater than 95. Thus, in this embodiment, the mixed light coordinate 17 of the light mixed by the first white light source group 11, the second white light source group 12 and the third white light source group 13 is located on or close to the blackbody radiation locus 41. As such, the light mixed by the light source unit 1 is highly similar to sunlight, and thus achieves the effect of reproducing the real colors of objects.

TABLE 2

| Correlated color temperature | First white light source group 1800 K | Second white light source group 3500 K | Third white light source group 10000 K | $D_{uv}$ value | CRI value |
|---|---|---|---|---|---|
| 2000 K | 96% | 1% | 3% | 0.0002 | 95.23 |
| 2200 K | 86% | 13% | 2% | 0.0000 | 97.57 |
| 2400 K | 74% | 26% | 1% | −0.0001 | 97.77 |
| 2600 K | 59% | 40% | 1% | −0.0001 | 97.83 |
| 2700 K | 53% | 47% | 2% | 0.0000 | 97.92 |
| 2800 K | 47% | 53% | 2% | −0.0001 | 97.94 |
| 3000 K | 35% | 63% | 3% | 0.0000 | 97.94 |
| 3200 K | 27% | 69% | 6% | 0.0000 | 97.76 |
| 3400 K | 20% | 73% | 8% | 0.0001 | 97.72 |
| 3600 K | 15% | 76% | 11% | −0.0001 | 97.57 |
| 3800 K | 11% | 77% | 14% | 0.0001 | 97.62 |
| 4000 K | 8% | 77% | 18% | 0.0000 | 97.58 |
| 4200 K | 5% | 75% | 22% | 0.0001 | 97.66 |
| 4300 K | 4% | 75% | 23% | 0.0001 | 97.67 |
| 4500 K | 2% | 71% | 27% | 0.0000 | 97.67 |
| 4700 K | 1% | 68% | 31% | 0.0001 | 97.79 |
| 4900 K | 0% | 66% | 37% | 0.0001 | 97.89 |
| 5000 K | 0% | 64% | 38% | 0.0000 | 97.99 |
| 5300 K | 0% | 55% | 46% | −0.0001 | 97.91 |
| 5600 K | 0% | 48% | 53% | −0.0002 | 97.78 |
| 5700 K | 0% | 46% | 56% | −0.0002 | 97.70 |
| 6000 K | 0% | 40% | 62% | −0.0001 | 97.62 |
| 6500 K | 0% | 31% | 71% | −0.0001 | 97.37 |
| 7000 K | 1% | 21% | 80% | −0.0001 | 97.27 |
| 7500 K | 2% | 14% | 85% | 0.0000 | 97.35 |
| 8000 K | 4% | 7% | 92% | 0.0000 | 97.27 |
| 8500 K | 5% | 2% | 94% | 0.0000 | 97.45 |
| 9000 K | 4% | 0% | 99% | 0.0017 | 98.36 |
| 9500 K | 2% | 0% | 100% | 0.0031 | 98.26 |
| 10000 K | 0% | 0% | 103% | 0.0042 | 97.47 |

Referring to FIGS. 3 and 13 to 16, the light source unit 1 is disposed on the substrate 3. In this embodiment, the five types of arrangement of the light source unit 1 on the substrate 3 are described hereinafter. It should be noted that the types of arrangement of the light source unit 1 are not limited to those described in the present disclosure.

As shown in FIG. 3, in the first type of arrangement, the light source unit 1 is distributed on an upper right portion, an upper left portion, a lower right portion and a lower left portion of the substrate 3. In the upper right portion, the first light-emitting elements 111 of the first white light source group 11, the second light-emitting elements 121 of the second white light source group 12, and the third light-emitting elements 131 of the third white light source group

13 are respectively arranged in lines in such order repeatedly from right to left; in the upper left portion, the first light-emitting elements 111 of the first white light source group 11, the third light-emitting elements 131 of the third white light source group 13 and the second light-emitting elements 121 of the second white light source group 12 are respectively arranged in lines in such order repeatedly from left to right; in the lower right portion, the first light-emitting elements 111 of the first white light source group 11, the third light-emitting elements 131 of the third white light source group 13 and the second light-emitting elements 121 of the second white light source group are respectively arranged in lines in such order repeatedly from right to left; and in the lower left portion, the first light-emitting elements 111 of the first white light source group 11, the second light-emitting elements 121 of the second white light source group 12 and the third light-emitting elements 131 of the third white light source group 13 are respectively arranged in lines in such order repeatedly from left to right.

Figure 13:
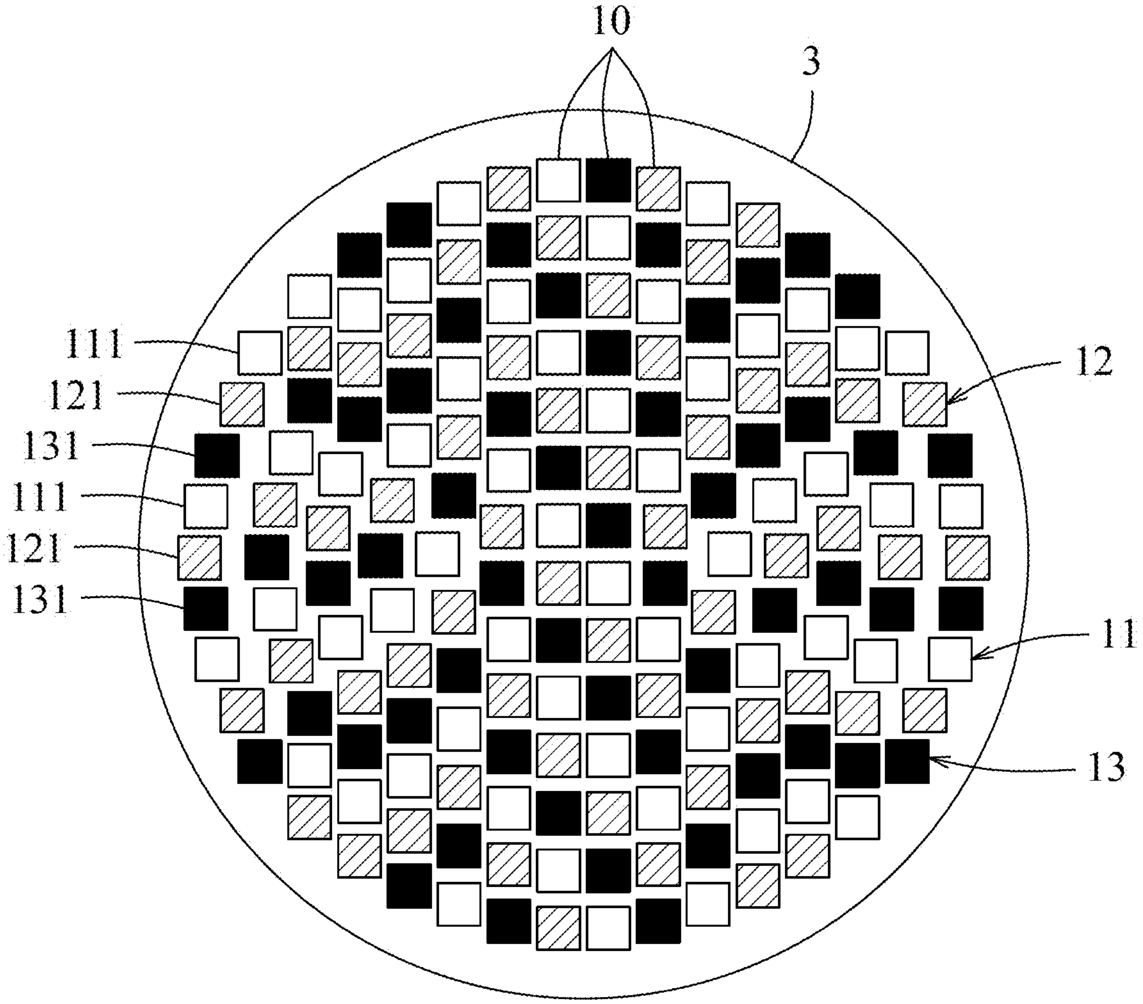
FIGS. 13 to 16 are schematic views respectively showing different arrangements of the first white light source group, the second white light source group and the third white light source group of the lighting apparatus according to the first embodiment of the present disclosure.

As shown in FIG. 13, in the second type of arrangement, the first light-emitting elements 111 of the first white light source group 11, the second light-emitting elements 121 of the second white light source group 12 and the third light-emitting elements 131 of the third white light source group 13 are arranged in such order repeatedly from top to bottom and then from left to right on the substrate 3.

Figure 14:
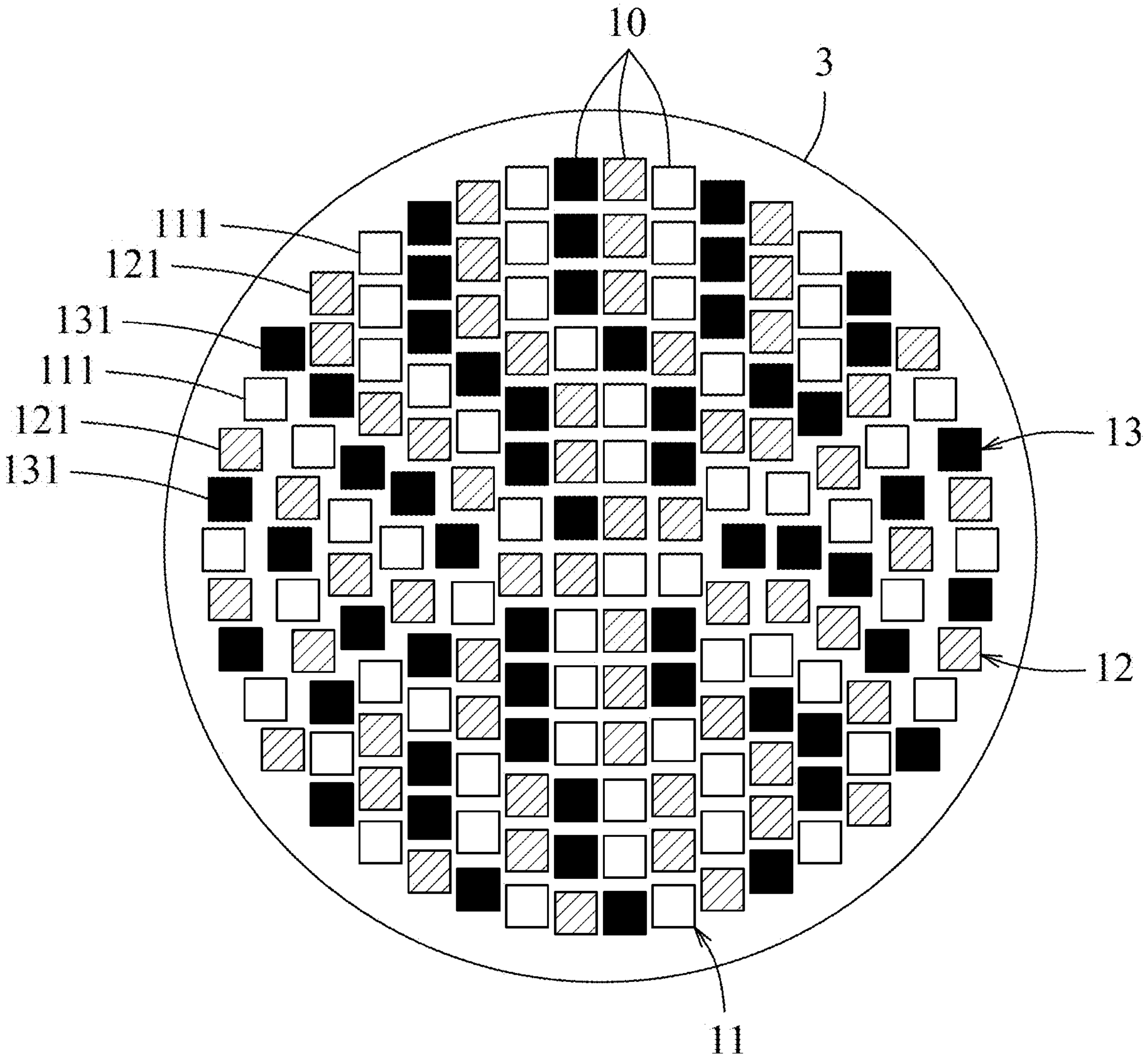

As shown in FIG. 14, in the third type of arrangement, the first light-emitting elements 111 of the first white light source group 11, the second light-emitting elements 121 of the second white light source group 12 and the third light-emitting elements 131 of the third white light source group 13 are arranged in annular arrays around a center of the substrate 3, and in each of the annular arrays, the first light-emitting elements 111 of the first white light source group 11, the second light-emitting elements 121 of the second white light source group 12 and the third light-emitting elements 131 of the third white light source group 13 are arranged in such order repeatedly.

Figure 15:
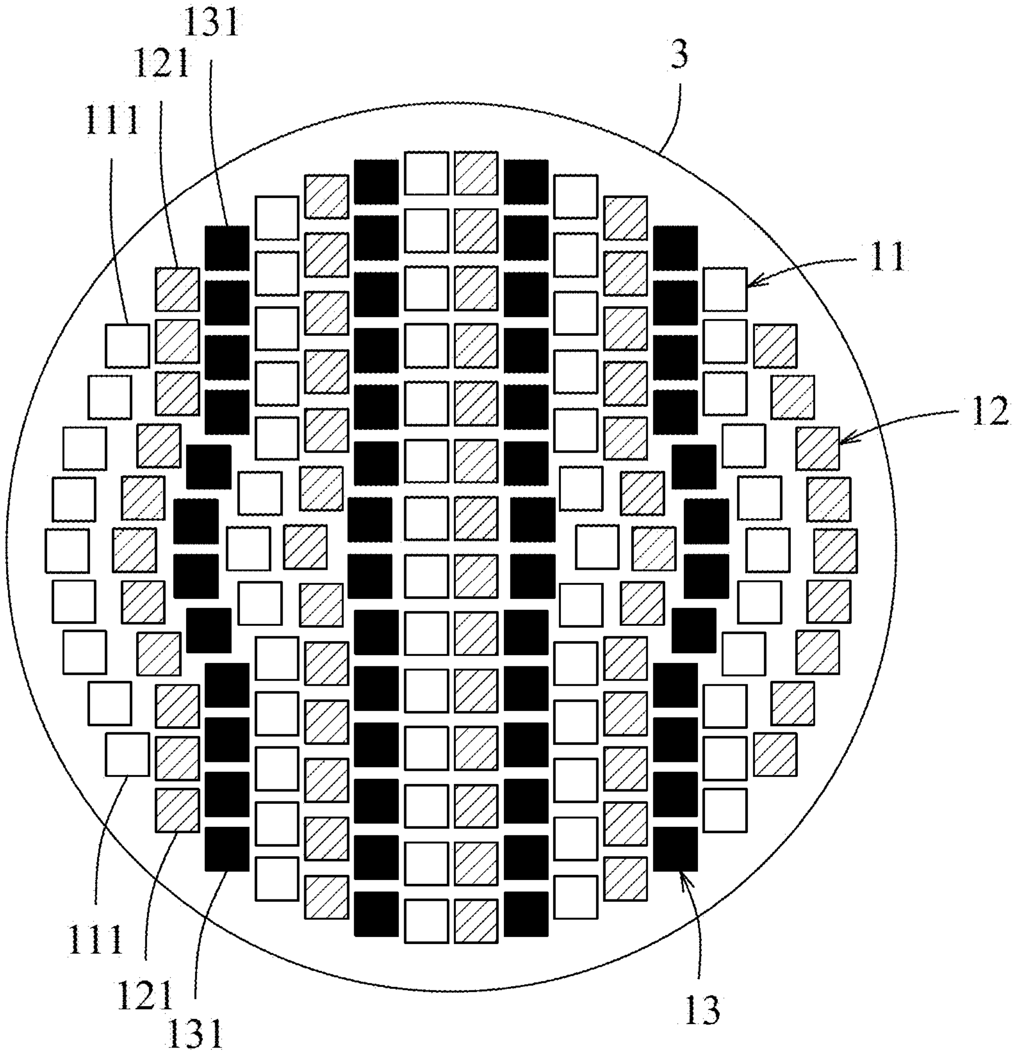

As shown in FIG. 15, in the fourth type of arrangement, the first light-emitting elements 111 of the first white light source group 11, the second light-emitting elements 121 of the second white light source group 12 and the third light-emitting elements 131 of the third white light source group 13 are respectively arranged in lines in such order repeatedly from left to right on the substrate 3.

Figure 16:
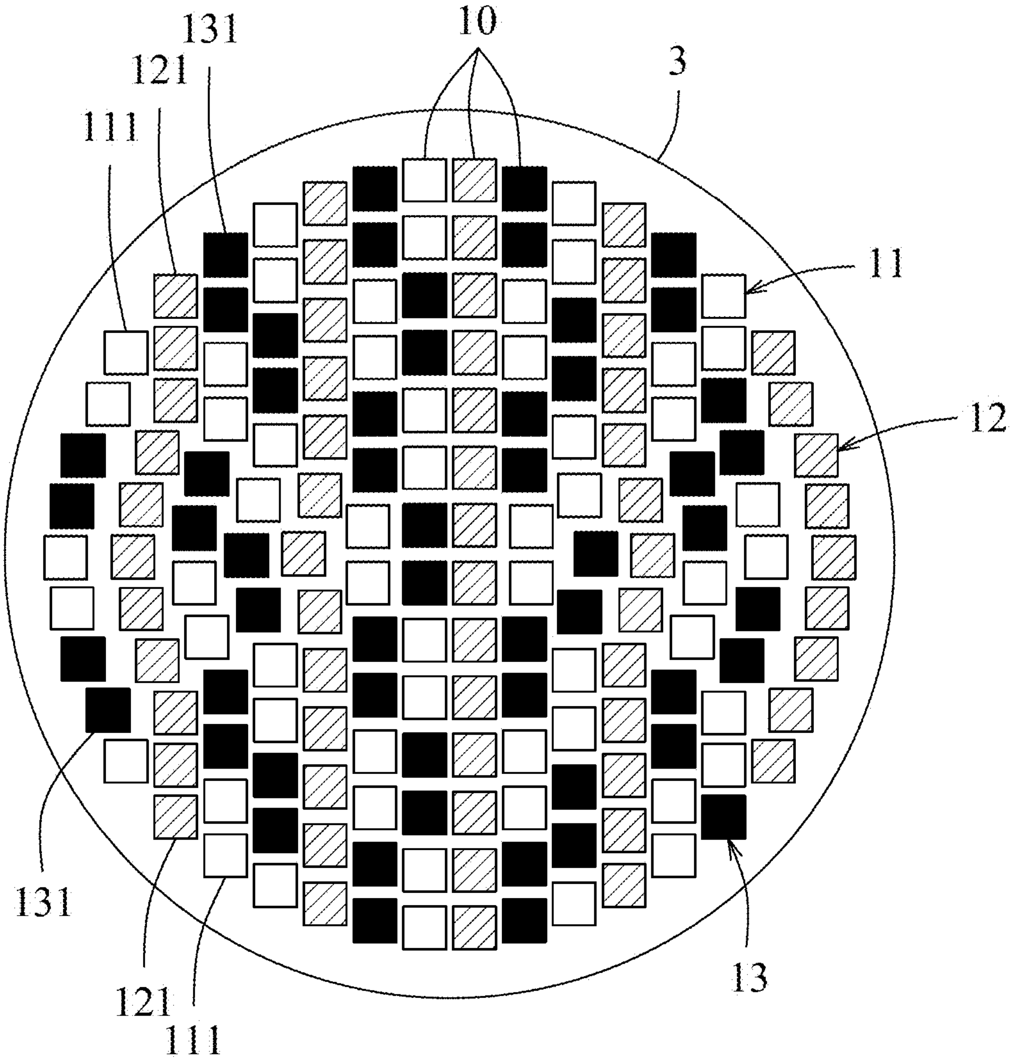

As shown in FIG. 16, in the fifth type of arrangement, the second light-emitting elements 121 of the second white light source group 12 are arranged in a line, and then two of the first light-emitting elements 111 of the first white light source group 11 and two of the third light-emitting elements 131 of the third white light source group 13 are grouped together and arranged in lines, and such order of arrangements are repeated from left to right on the substrate 3.

Figure 17:
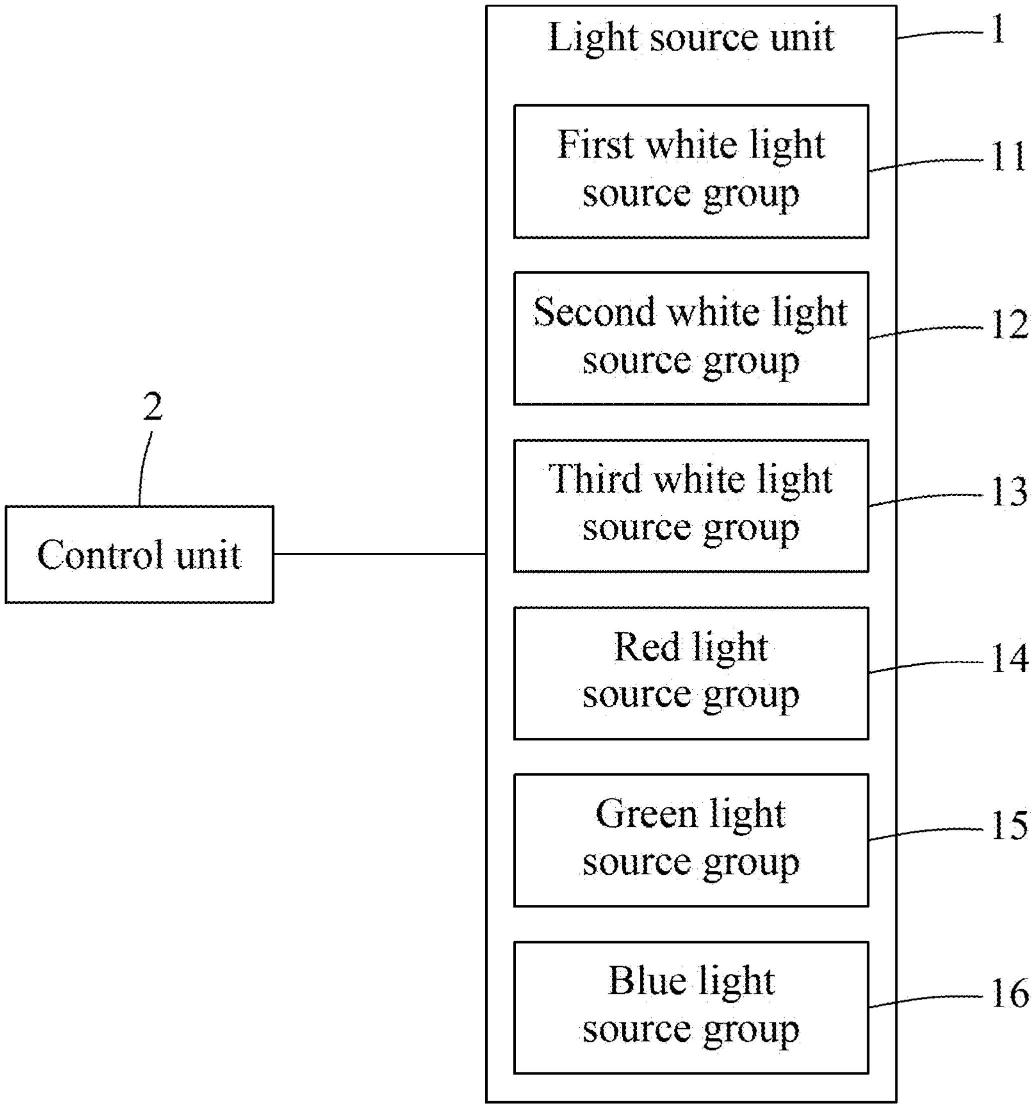
FIG. 17 is a block diagram illustrating the configuration of a lighting apparatus according to a second embodiment of the present disclosure.

The lighting apparatus according to a second embodiment of the present disclosure is described with reference to FIGS. 17 to 19. The configuration of the lighting apparatus of the second embodiment is substantially similar to that of the lighting apparatus of the first embodiment, except that, in the second embodiment, the light source unit 1 further includes a red light source group 14, a green light source group 15 and a blue light source group 16 (see FIG. 17) that are respectively capable of emitting red light, green light and blue light. That is, in the second embodiment, in addition to the first white light source group 11, the second white light source group 12 and the third white light source group 13 each emitting white light, the red light source group 14, the green light source group 15 and the blue light source group 16 that respectively emit red light, green light and blue light are also included.

The red light source group 14 includes a plurality of red LEDs (not shown) having a peak wavelength selected from the range of 620~670 nm, the green light source group 15 includes a plurality of green LEDs (not shown) having a peak wavelength selected from the range of 520~540 nm, and the blue light source group 16 includes a plurality of blue LEDs (not shown) having a peak wavelength selected from the range of 400~480 nm. The red light source group 14, the green light source group 15 and the blue light source group 16 are each configured to emit a monochromatic light which has a full width at half maximum (FWHM) ranging from 5 nm to 30 nm. In this embodiment, the spectral waveform of light emitted by the red light source group 14 is a fourth spectral waveform 142, the spectral waveform of light emitted by the green light source group 15 is a fifth spectral waveform 152, and the spectral waveform of light emitted by the blue light source group 16 is a sixth spectral waveform 162 (see FIG. 19).

Figure 18:
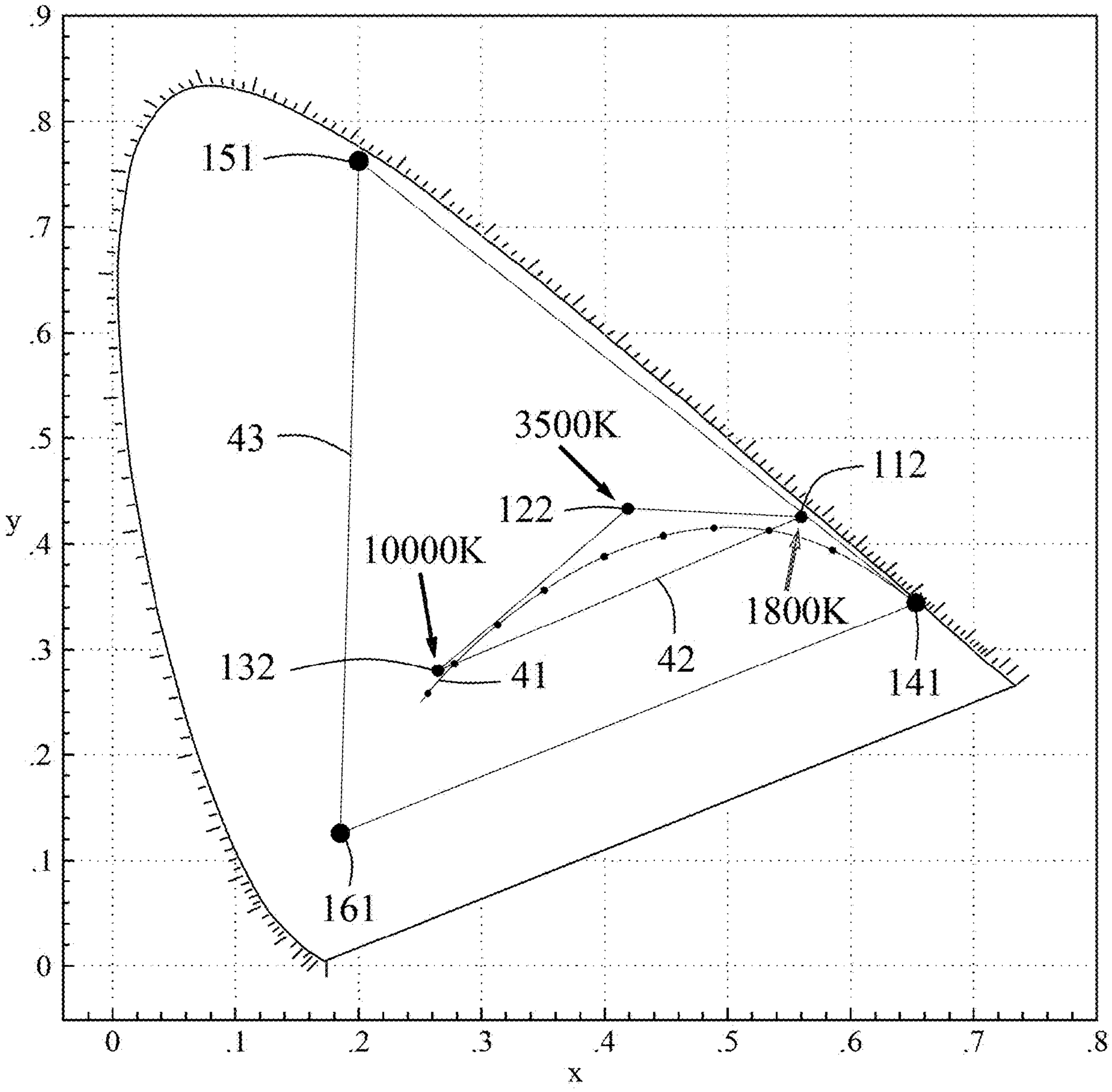
FIG. 18 is a CIE chromaticity diagram illustrating the chromaticity coordinates of the first white light source group, the second white light source group and the third white light source group, and the chromaticity coordinates of a red light source group, a green light source group and a blue light source group of the lighting apparatus according to the second embodiment of the present disclosure.
Figure 19:
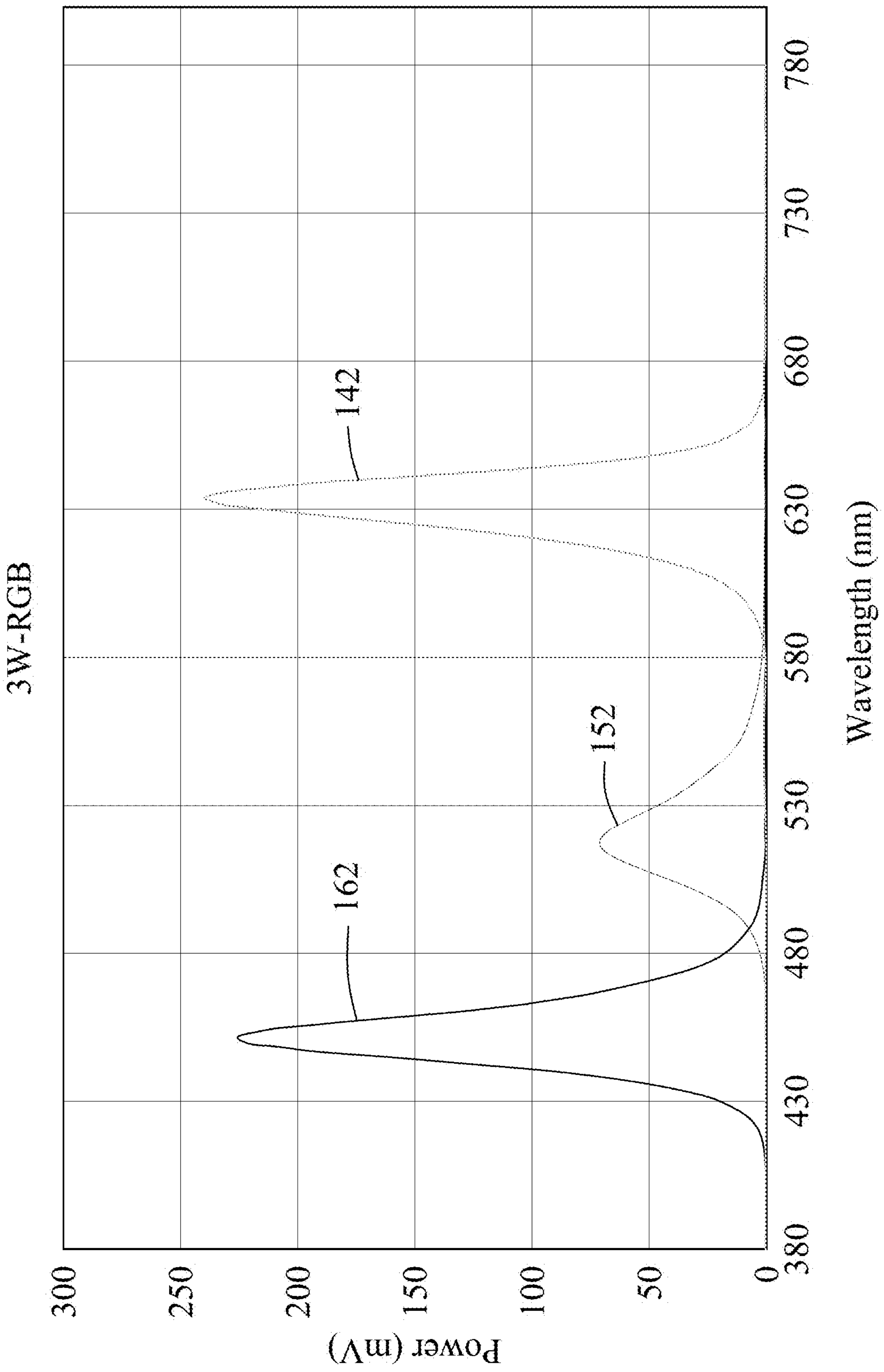
FIG. 19 shows spectral waveforms of light emitted by the red light source group, the green light source group and the blue light source group of the lighting apparatus according to the second embodiment of the present disclosure.

Referring to FIG. 18, in the CIE chromaticity diagram, the chromaticity coordinate of the red light source group 14 is defined as fourth coordinate 141, the chromaticity coordinate of the green light source group 15 is defined as fifth coordinate 151, and the chromaticity coordinate of the blue light source group 16 is defined as sixth coordinate 161. As shown in FIG. 18, a second line has three line segments each of which interconnects two corresponding ones of the fourth coordinate 141, the fifth coordinate 151 and the sixth coordinate 161. The second line encloses and defines a second chromaticity region 43, and an area of the second chromaticity region 43 is greater than an area of the first chromaticity region 42.

In the second embodiment, the red light source group 14, the green light source group 15 and the blue light source group 16 are electrically connected to the control unit 2, such that when the control unit 2 provides the electrical energy to the light source unit 1, brightness of each of the red light source group 14, the green light source group 15 and the blue light source group 16 is able to be altered by the control unit 2.

In practical applications, the power ratio of the first white light source group 11, to the second white light source group 12, and to the third white light source group 13 is first adjusted by the control unit 2, so that the light control unit 1 provides a mixed light serving as a base light whose chromaticity coordinate is close to the blackbody radiation locus 41. After that, depending on requirements, the power ratio of the red light source group 14, to the green light source group 15, and to the blue light source group 16 is adjusted by the control unit 2, so as to adjust the color and brightness of the base light. Thus, the lighting apparatus of the second embodiment may be used for various purposes, e.g., photography, etc. For example, when the lighting apparatus of this embodiment is used in photography for simulating a reddish light resembling sunset light, the light source unit 1 is adjusted by the control unit 2 to obtain a base light whose chromaticity coordinate is close to the blackbody radiation locus 41, followed by adjusting the brightness of the red light source group 14 in accordance to the desired saturation of red light, thereby permitting the lighting apparatus to emit the reddish light resembling sunset light.

Figure 20:
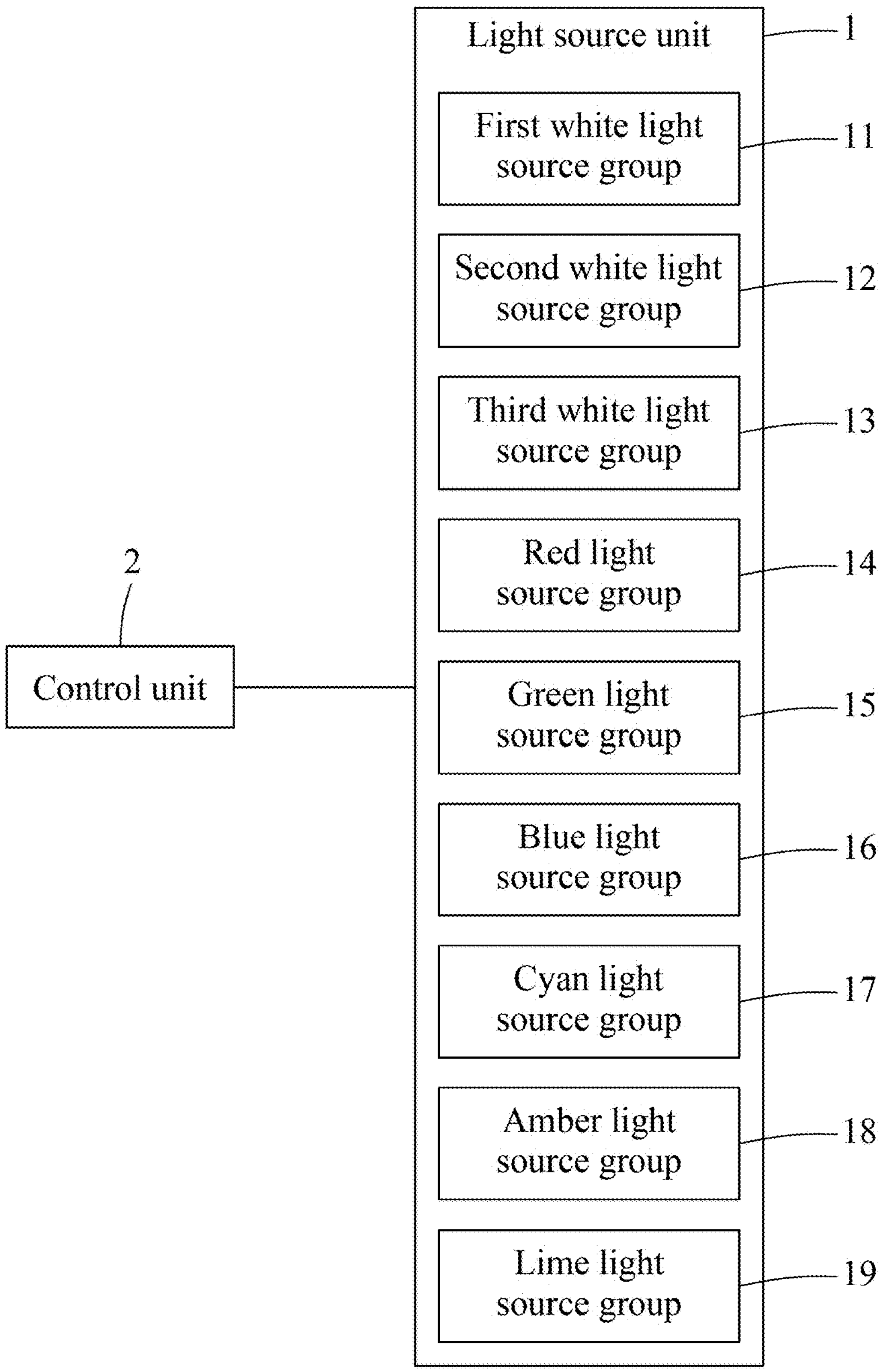
FIG. 20 is a block diagram illustrating the configuration of a lighting apparatus according to a third embodiment of the present disclosure.
Figure 21:
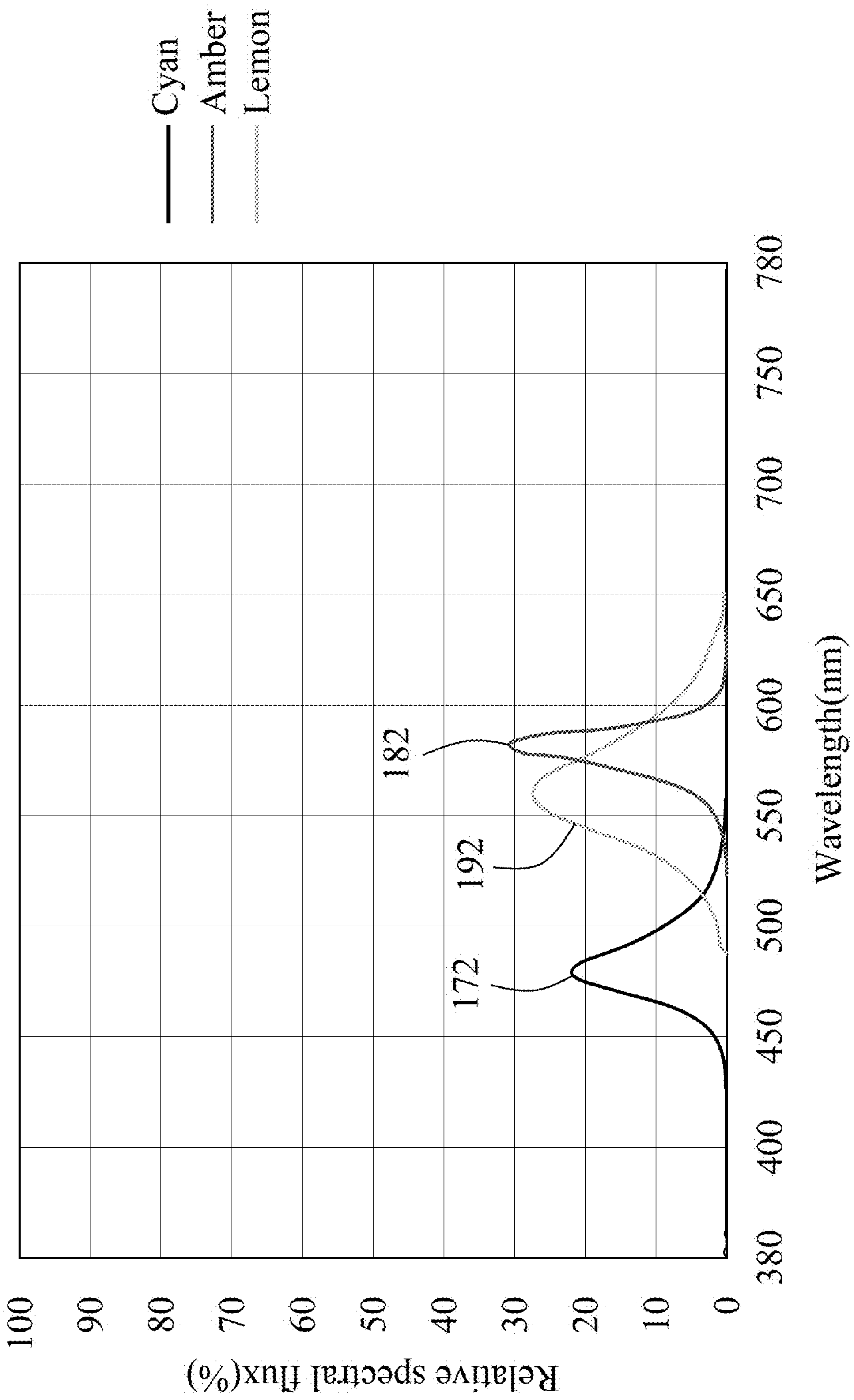
FIG. 21 shows spectral waveforms of light emitted by a cyan light source group, an amber light source group and a lime light source group of the lighting apparatus according to the third embodiment of the present disclosure.

The lighting apparatus according to a third embodiment of the present disclosure is described with reference to FIGS. 20 to 22. The configuration of the lighting apparatus of the third embodiment is substantially similar to that of the lighting apparatus of the second embodiment, except that, in the third embodiment, the light source unit 1 further includes a cyan light source group 17, an amber light source group 18 and a lime light source group 19 (see FIG. 20) that are respectively capable of emitting cyan light, amber light and lime light.

The cyan light source group 17 includes a plurality of cyan LEDs (not shown) having a peak wavelength selected from the range of 480~500 nm, the amber light source group 18 includes a plurality of cyan LEDs (not shown) having a peak wavelength selected from the range of 580~600 nm, and the lime light source group 19 includes a plurality of blue LEDs (not shown) having a peak wavelength selected from the range of 550~570 nm. In this embodiment, the spectral waveform of light emitted by the cyan light source group 17 is a seventh spectral waveform 172, the spectral waveform of light emitted by the amber light source group 18 is an eighth spectral waveform 182, and the spectral waveform of light emitted by the lime light source group 19 is a ninth spectral waveform 192 (see FIG. 21).

Figure 22:
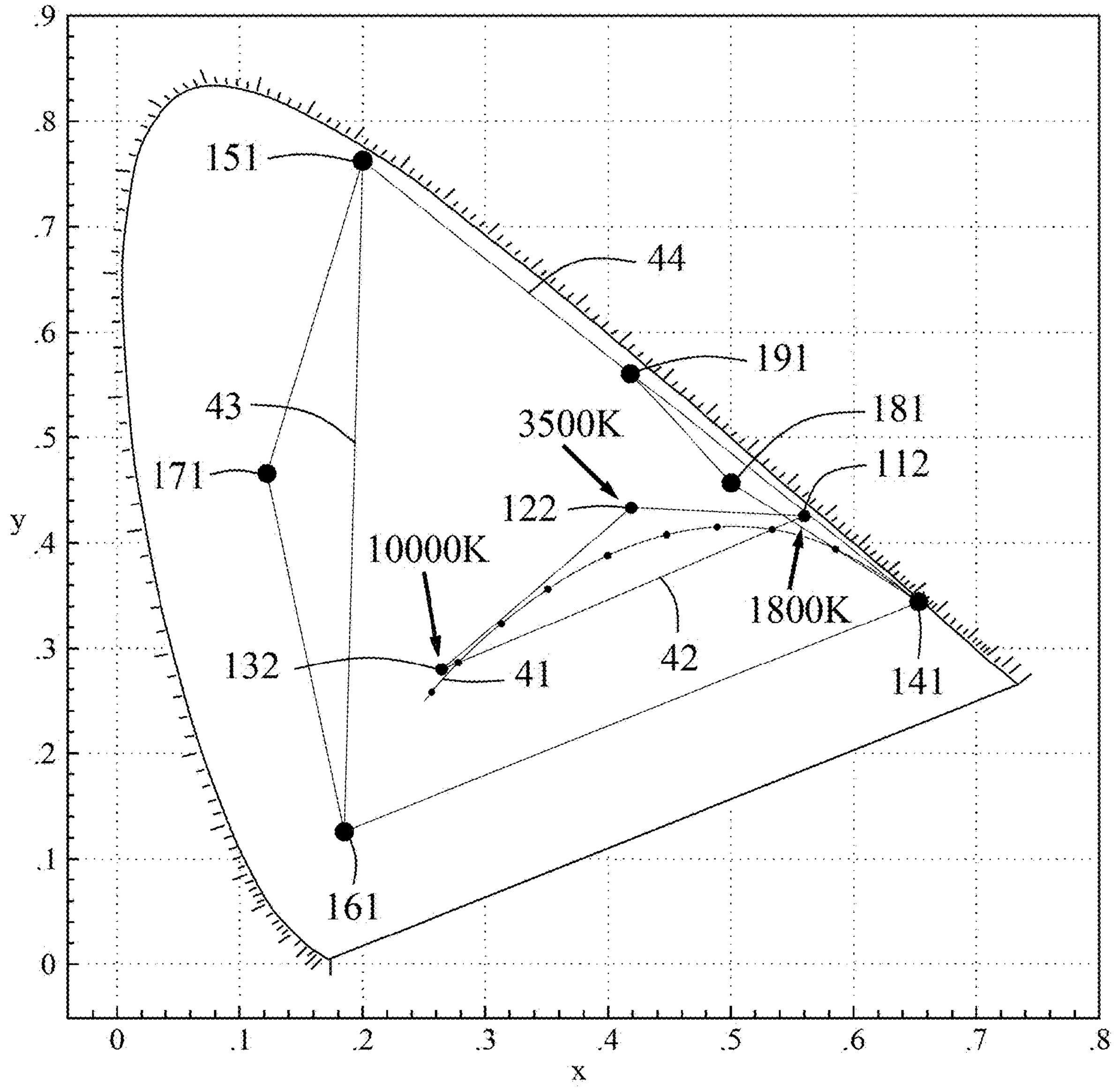
FIG. 22 is a CIE chromaticity diagram illustrating the chromaticity coordinates of the first white light source group, the second white light source group and the third white light source group, the chromaticity coordinates of a red light source group, a green light source group and a blue light source group, and the chromaticity coordinates of the cyan light source group, the amber light source group and the lime light source group of the lighting apparatus according to the third embodiment of the present disclosure.

Referring to FIG. 22, in the CIE chromaticity diagram, the chromaticity coordinate of the cyan light source group 17 is defined as fifth coordinate 171, the chromaticity coordinate of the amber light source group 18 is defined as amber coordinate 181, and the chromaticity coordinate of the lime light source group 19 is defined as ninth coordinate 191. As shown in FIG. 22, a third line extends from the fourth coordinate 141 and sequentially through the eighth coordinate 181, the ninth coordinate 191, the fifth coordinate 151, the seventh coordinate 171, the sixth coordinate 161, and then back to the fourth coordinate 141 to enclose and define a third chromaticity region 44. An area of the third chromaticity region 44 is greater than either an area of the first chromaticity region 42 or an area of the second chromaticity region 43.

In the third embodiment, the cyan light source group 17, the amber light source group 18 and the lime light source group 19 are electrically connected to the control unit 2, such that when the control unit 2 provides the electrical energy to the light source unit 1, brightness of each of the cyan light source group 17, the amber light source group 18 and the lime light source group 19 is able to be altered by the control unit 2.

In practical applications, the power ratio of the first white light source group 11, to the second white light source group 12, and to the third white light source group 13 is first adjusted by the control unit 2, so that the light control unit 1 provides a mixed light serving as a base light whose chromaticity coordinate is close to the blackbody radiation locus 41. After that, depending on requirements, the power ratio of the red light source group 14, to the green light source group 15, and to the blue light source group 16, and/or the power ratio of the cyan light source group 17, to the amber light source group 18 and to the lime light source group 19 are adjusted by the control unit 2, so as to adjust the color and brightness of the base light. Thus, the lighting apparatus of the third embodiment may be used for various purposes, e.g., photography, etc.

In summary, by inclusion of the first, second and third white light source groups 11, 12, 13 having different correlated color temperatures, and a portion of blackbody radiation locus 41 being located within the first chromaticity region 42 in the CIE chromaticity diagram, and with the brightness of each of the first, second and third white light source groups 11, 12, 13 being controlled by the control unit 2, the mixed light coordinate 17 of a light mixed by the first, second and third white light source groups 11, 12 13 is located on or close to the blackbody radiation locus 41 within the first chromaticity region 42. Thus, the light emitted from the light source unit 1 is substantially similar to sunlight. As such, the lighting apparatus of the present disclosure achieves the effect of reproducing the real colors of objects.

In addition, by further inclusion of the red, green and blue light source groups 14, 15, 16 and/or inclusion of the cyan, amber and lime light source groups 17, 18, 19, and after obtaining the base light whose chromaticity coordinate is close to the blackbody radiation locus 41, the power ratio of the red, green and blue light source groups 14, 15, 16 and/or the power ratio of cyan, amber and lime light source groups 17, 18, 19 are adjusted depending on requirements, so as to adjust the color and brightness of the base light. Therefore, the color saturation of a light source obtained after light mixing can be enhanced while taking into account such light source has a good color rendering property. As such, the lighting apparatus of the present disclosure is suitable for use in photography or other applications in various environments.

Lastly, by inclusion of the light source unit 1 and the control unit 2, the lighting apparatus of the present disclosure is capable of achieving the effects as follows. First, the lighting apparatus of the present disclosure is capable of simulating the standard illuminants set by the International Commission on Illumination (CIE) as follows: illuminants A, B and C having color temperatures of 2856 K, 4874 K and 6774 K, respectively, and the D series of illuminants including D50, D55, D65 and D75 which have color temperatures of 5000 K, 5500 K, 6500 K and 7500 K, respectively. Second, the lighting apparatus of the present disclosure is capable of adjusting the $D_{uv}$ value of a mixed light (e.g., light mixed by the first white light source group 11, the second white light source group 12 and the third white light source group 13). For example, after defining the first coordinate 112, the second coordinate 122 and the third coordinate 132 in the CIE chromaticity diagram, if the second coordinate 122 is altered while the first coordinate 112 and the third coordinate 132 are fixed, the positive deviation and the negative deviation of the first $D_{uv}$ value from the first color temperature coordinate 51 will be altered, and the positive deviation and the negative deviation of the second $D_{uv}$ value from the second color temperature coordinate 61 will also be altered, resulting in alteration in the first chromaticity region 42 for the mixed light. It should be noted that, the positive deviation of the first $D_{uv}$ value from the first color temperature coordinate 51 may be different from the negative deviation of the first $D_{uv}$ value from the first color temperature coordinate 51, and that the positive deviation of the second $D_{uv}$ value from the second color temperature coordinate 61 may be different from the negative deviation of the second $D_{uv}$ value from the second color temperature coordinate 61. In other words, a user can select a color temperature ranging between the first color temperature coordinate 51 and the second color temperature coordinate 61, so that the mixed light emitted by the lighting apparatus may have a different color depending on the thus selected color temperature. In addition, after determining the first color temperature coordinate 51, the second color temperature coordinate 61, the positive and negative deviations of the first $D_{uv}$ value from the first color temperature coordinate 51, and the positive and negative deviations of the second $D_{uv}$ value from the second color temperature coordinate 61, determination of the first coordinate 112, the second coordinate 122 and the third coordinate 132 can performed as mentioned in the foregoing, so that the first chromaticity region 42 of the mixed light can be effectively determined. Therefore, if the second coordinate 122 is altered by changing the second white light source group 12, which results in alteration of the first chromaticity region 42 for the mixed light, the $D_{uv}$ value of the mixed light may be adjusted, based on the positive and negative deviations of the first $D_{uv}$ value from the first color temperature coordinate 51 and the positive and negative deviations of the second $D_{uv}$ value from the second color temperature coordinate 61, without changing the first white light source group 11 and the third white light source group 13.

Therefore, the purpose of the present disclosure can indeed be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A lighting apparatus, comprising:

a light source unit including a first white light source group, a second white light source group and a third white light source group each of which is capable of emitting a white light, wherein in a CIE chromaticity diagram, chromaticity coordinates of said first white light source group, said second white light source group and said third white light source group are defined as a first coordinate, a second coordinate and a third coordinate, respectively, said first white light source group, said second white light source group and said third white light source group have different correlated color temperatures, in the CIE chromaticity diagram, a first line has three line segments each of which interconnects two corresponding ones of the first coordinate, the second coordinate and the third coordinate, said first line intersecting a blackbody radiation locus, and enclosing and defining a first chromaticity region, a portion of the blackbody radiation locus being located within the first chromaticity region, in the CIE chromaticity diagram, a chromaticity coordinate of a light mixed by said first white light source group, said second white light source group and said third white light source group is defined as a mixed light coordinate, in the CIE chromaticity diagram, the second coordinate is positioned within a quadrilateral region formed by four lines interconnecting a first point represented by coordinate of (x=0.47095, y=0.417), a second point represented by coordinate of (x=0.36139, y=0.36706), a third point represented by coordinate of (x=0.53479, y=0.5279) and a fourth point represented by coordinate of (x=0.37516, y=0.44772) in an xy chromaticity space; and a control unit that is electrically connected to the light source unit, such that when said control unit provides an electrical energy to said light source unit to control brightness of each of said first white light source group, said second white light source group and said third white light source group, the mixed light coordinate moves within the first chromaticity region.

2. The lighting apparatus as claimed in claim 1, wherein at least two of the first coordinate, the second coordinate and the third coordinate are not located on the blackbody radiation locus.

3. The lighting apparatus as claimed in claim 1, wherein the first coordinate, the second coordinate and the third coordinate are not located on the blackbody radiation locus.

4. The lighting apparatus as claimed in claim 1, wherein the first line intersects the blackbody radiation locus at two intersection points, a color temperature of one of the two intersection points being not greater than 2200 K, the color temperature of the other one of the two intersection points being not less than 8500 K.

5. The lighting apparatus as claimed in claim 1, wherein the first line intersects the blackbody radiation locus at two intersection points, a color temperature of one of the two intersection points being not greater than 1600 K, the color temperature of the other one of the two intersection points being not less than 20000 K.

6. The lighting apparatus as claimed in claim 1, wherein one of the three line segments, which interconnects the first coordinate and the third coordinate, intersects the blackbody radiation locus at two intersection points, a color temperature of one of the two intersection points being not greater than 2200 K, the color temperature of the other one of the two intersection points being not less than 8500 K.

7. The lighting apparatus as claimed in claim 1, wherein one of the three line segments, which interconnects the first coordinate and the third coordinate, intersects the blackbody radiation locus at two intersection points, a color temperature of one of the two intersection points being not greater than 1600 K, the color temperature of the other one of the two intersection points being not less than 20000 K.

8. The lighting apparatus as claimed in claim 1, wherein a correlated color temperature of the first coordinate ranges from 1600 K to 2600 K.

9. The lighting apparatus as claimed in claim 8, wherein a correlated color temperature of the second coordinate ranges from 2600 K to 4500 K.

10. The lighting apparatus as claimed in claim 9, wherein a correlated color temperature of the third coordinate ranges from 8000 K to 20000 K.

11. The lighting apparatus as claimed in claim 1, further comprising a substrate, said first white light source group, said second white light source group and said third white light source group being arranged in a staggered orientation on said substrate.

12. The lighting apparatus as claimed in claim 1, wherein said light source unit further includes a red light source group, a green light source group and a blue light source group that are capable of emitting a red light, a green light and a blue light, respectively, said red light source group, said green light source group and said blue light source group being electrically connected to said control unit, such that when said control unit provides the electrical energy to said light source unit, brightness of each of said red light source group, said green light source group and said blue light source group is altered by said control unit.

13. The lighting apparatus as claimed in claim 12, wherein in the CIE chromaticity diagram, the chromaticity coordinates of said red light source group, said green light source group and said blue light source group are defined as a fourth coordinate, a fifth coordinate and a sixth coordinate, respectively, a second line has three line segments each of which interconnects two corresponding ones of the fourth coordinate, the fifth coordinate and the sixth coordinate, and encloses and defines a second chromaticity region, and an area of the second chromaticity region is greater than an area of the first chromaticity region.

14. The lighting apparatus as claimed in claim 12, wherein said light source unit further includes a cyan light source group, an amber light source group and a lime light source group that are capable of emitting a cyan light, a lime light and a amber light, respectively, said cyan light source group, said lime light source group and said amber light source group being electrically connected to said control unit, such that when said control unit provides the electrical energy to said light source unit, brightness of each of said cyan light source group, said lime light source group and said amber light source group is altered by said control unit.

15. The lighting apparatus as claimed in claim 14, wherein in the CIE chromaticity diagram, the chromaticity coordinates of said cyan light source group, said lime light source group and said amber light source group are defined as a seventh coordinate, a eighth coordinate and a ninth coordinate, respectively, a third line extends from the fourth coordinate and sequentially through the eighth coordinate, the ninth coordinate, the fifth coordinate, the seventh coordinate, and the sixth coordinate, and then back to the fourth coordinate to enclose and define a third chromaticity region, an area of the third chromaticity region is greater than either an area of the first chromaticity region or an area of the second chromaticity region.

16. The lighting apparatus as claimed in claim 1, wherein each of the first white light source group, the second white light source group and the third white light source group includes a light-emitting element, said light-emitting element comprising:

a bottom plate;

a first light-emitting diode, a second light-emitting diode and a third light-emitting diode each disposed on said bottom plate, said light-emitting diode, said second light-emitting diode and said third light-emitting diode being capable of emitting a first blue light having a wavelength ranging from 410 nm to 450 nm, a second blue light having a wavelength ranging from 450 nm to 470 nm, and a third blue light having a wavelength ranging from 460 nm to 490 nm, respectively; and three phosphor layers respectively covering a surface of said first light-emitting diode, a surface of said second light-emitting diode, and a surface of said third light-emitting diode, wherein said three phosphor layers, after absorbing the first blue light, the second blue light and the third blue light, respectively, are excited by the first blue light, the second blue light and the third blue light, respectively, to emit predetermined lights, respectively, such that when the predetermined lights are mixed with each other, said light-emitting element emits the white light.

17. The lighting apparatus as claimed in claim 16, wherein the white light emitted by the light-emitting element has a color rendering index R9 of greater than 91 at an ambient temperature ranging from 30° C. to 90° C.

18. The lighting apparatus as claimed as claim 16, wherein the white light emitted by the light-emitting element has a color rendering index R12 of greater than 91 at an ambient temperature ranging from 30° C. to 90° C.

19. The lighting apparatus as claimed in claim 1, wherein the first coordinate, the second coordinate and the third coordinate are defined by the following steps:

determining a first color temperature coordinate and a second color temperature coordinate on the blackbody radiation locus;

determining, a first positive intersection point, a first negative intersection point, a second positive intersection point and a second negative intersection point, the first positive intersection point and the first negative intersection point being located on a first isochromatic temperature line passing through the first color temperature coordinate, and being respectively a positive deviation and a negative deviation of a first $D_{uv}$ value from the first color temperature coordinate 51, the second positive intersection point and the second negative intersection point being located on a second isochromatic temperature line passing through the second color temperature coordinate, and being respectively a positive deviation and a negative deviation of a second $D_{uv}$ value from the second color temperature coordinate 61, the positive deviation of the first $D_{uv}$ value and the positive deviation of the second $D_{uv}$ value each being greater than 0, the negative deviation of the first $D_{uv}$ value and the negative deviation of the second $D_{uv}$ value each being less than 0;

determining a first tangent line and a second tangent line respectively along two tangent lines of the blackbody radiation locus, such that that the first tangent line and the second tangent line pass through the first color temperature coordinate and the second color temperature coordinate, respectively; and defining the three line segments of the first line respectively as a first line segment that is parallel to the first tangent line and passes through the first positive intersection point, a second line segment that is parallel to the second tangent line and passes through the first positive intersection point, and a third line segment that passes through the first negative intersection point and the second negative intersection point, such that the second coordinate is defined as an intersection point between the first line segment and the second line segment, the third coordinate is defined as an intersection point between the first line segment and the third line segment, and the first coordinate is defined as an intersection point between the second line segment and the third line segment.

* * * * *